United States Patent
Komatsu et al.

(10) Patent No.: US 10,409,070 B2
(45) Date of Patent: Sep. 10, 2019

(54) VIRTUAL IMAGE DISPLAY APPARATUS

(71) Applicant: SEIKO EPSON CORPORATION, Tokyo (JP)

(72) Inventors: Akira Komatsu, Tatsuno-machi (JP); Masayuki Takagi, Matsumoto (JP); Toshiaki Miyao, Matsumoto (JP); Takashi Takeda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/011,816

(22) Filed: Jun. 19, 2018

(65) Prior Publication Data

US 2019/0004317 A1  Jan. 3, 2019

(30) Foreign Application Priority Data

Jun. 30, 2017 (JP) ................................. 2017-128484
Feb. 13, 2018 (JP) ................................. 2018-022831

(51) Int. Cl.
*G02B 27/01* (2006.01)
*F21V 8/00* (2006.01)
*G02B 6/00* (2006.01)

(52) U.S. Cl.
CPC .......... *G02B 27/0172* (2013.01); *G02B 6/00* (2013.01); *G02B 6/002* (2013.01); *G02B 6/0055* (2013.01); *G02B 2027/0116* (2013.01); *G02B 2027/0178* (2013.01)

(58) Field of Classification Search
CPC .............. G02B 6/00; G02B 27/01; F21V 8/00
USPC ......................................................... 385/37
See application file for complete search history.

(56) References Cited

U.S. PATENT DOCUMENTS

| | | | |
|---|---|---|---|
| 5,035,473 A * | 7/1991 | Kuwayama | G02B 27/0103 359/13 |
| 5,436,763 A | 7/1995 | Chen et al. | |
| 6,097,550 A | 8/2000 | Kimura | |
| 7,418,170 B2 * | 8/2008 | Mukawa | G02B 6/0033 385/31 |
| 8,570,244 B2 | 10/2013 | Mukawa | |
| 2014/0140653 A1 * | 5/2014 | Brown | G02B 6/0033 385/10 |
| 2017/0219830 A1 | 8/2017 | Komatsu et al. | |
| 2019/0086598 A1 * | 3/2019 | Futterer | G02B 6/0031 |

FOREIGN PATENT DOCUMENTS

| | | |
|---|---|---|
| JP | H06-027409 A | 2/1994 |
| JP | H09-159920 A | 6/1997 |
| JP | H10-221604 A | 8/1998 |

(Continued)

*Primary Examiner* — Kaveh C Kianni
(74) *Attorney, Agent, or Firm* — Oliff PLC

(57) ABSTRACT

A virtual image display apparatus includes an image projection apparatus that emits image light, and a display optical system that forms a virtual image according to the image light from a liquid crystal device (image forming device). The display optical system is configured by at least two members having different refractive indices and bends the image light a plurality of times between mediums having different refractive indices in a predetermined direction. A cumulative value of an index for chromatic dispersion with respect to the predetermined direction on a refractive surface of each bent portion is smaller than or equal to a predetermined reference value.

6 Claims, 13 Drawing Sheets

(56) References Cited

FOREIGN PATENT DOCUMENTS

| | | |
|---|---|---|
| JP | 2000-056259 A | 2/2000 |
| JP | 2007-011168 A | 1/2007 |
| JP | 2010-033026 A | 2/2010 |
| JP | 2011-070141 A | 4/2011 |
| JP | 5119667 B2 | 1/2013 |
| JP | 5316391 B2 | 10/2013 |
| JP | 2016-042136 A | 3/2016 |

* cited by examiner

VIRTUAL IMAGE DISPLAY APPARATUS

BACKGROUND

1. Technical Field

The present invention relates to a head mounted display used by being worn on a head, and other virtual image display apparatuses.

2. Related Art

Recently, various types of virtual image display apparatuses capable of forming and observing a virtual image, such as a head mounted display, are proposed in which a light guide plate guides image light from a display element to a pupil of an observer.

For example, there is a known image display apparatus including an image display element and a display optical system forming an intermediate image that guides image light from the image display element to eyes of an observer or a projected surface (JP-A-2007-11168). In the image display apparatus of JP-A-2007-11168, a bonding optical element in which a plurality of optical elements are bonded between the image display element and the intermediate image is disposed, and at least two optical elements formed of materials having different dispersions are included as the plurality of optical elements, and thereby, chromatic aberration is corrected.

However, in the optical system described in JP-A-2007-11168, the bonding optical element is disposed just in front of the intermediate image, an inclination angle of a refractive surface is not appropriate, and the chromatic aberration is not sufficiently corrected. That is, for example, in order to dispose the optical system along the head of a user, in a case where refractive surfaces inclined with respect to an optical axis in the optical system need to be provided in a plurality of positions, refraction angle dispersion of a light ray according to wavelength dispersion of each medium occurs on each inclined surface, resulting in lateral chromatic aberration. Compound chromatic aberration due to a plurality of inclined refractive surfaces is unclear in terms of conditions of correction, and thus, aberration is corrected while undergoing trial and error. In this case, unless the inclination angle of the refractive surface is appropriately set, lateral chromatic aberration is not sufficiently corrected, and desired optical performance is hardly achieved.

SUMMARY

An advantage of some aspects of the invention is to provide a virtual image display apparatus in which lateral chromatic aberration is reliably reduced while securing optical performance, even in a case where refractive surfaces inclined with respect to an optical axis is provided at a plurality of positions.

A virtual image display apparatus according to an aspect of the invention includes an image forming device that emits image light, and a display optical system that forms a virtual image according to the image light from the image forming device. The image light is incident on a position that is assumed to be eyes of an observer. The display optical system forms a surface-symmetric shape with respect to a predetermined surface. With respect to an image light ray that is emitted from a certain point of the image forming device and reaches a center of an eye of the observer via the display optical system, for the image light ray and a kth optical function surface of the display optical system, assuming that an angle which is formed by a line which is obtained by projecting a normal line of the optical function surface in a point at which the image light ray intersects the optical function surface onto a symmetric surface of the display optical system and a line which is obtained by projecting an incidence light ray onto the symmetric surface is referred to as $\alpha_k$, an angle which is formed by a line which is obtained by projecting the normal line of the optical function surface onto the symmetric surface and a line which is obtained by projecting an emission light ray onto the symmetric surface is referred to as $\beta_k$, a refractive index of a medium on an incidence side is referred to as $n_{k-1}$, a refractive index of a medium on an emission side is referred to as $n_k$, refractive index dispersion of the medium on the incidence side is referred to as $V_{k-1}$, refractive index dispersion of the medium on the emission side is referred to as $V_k$, a color dispersion index on the incidence side is referred to as $A_{k-1}$, a color dispersion index on the emission side is referred to as $A_k$, a target wavelength is referred to as $\lambda$ in μm unit, a diffraction order is referred to as integer $m_k$, and a pitch of a diffraction grating is referred to as $p_k$, when values of the color dispersion index $A_k$ are sequentially calculated by starting from $A_0=0$, based on following Expression (1), an absolute value of the color dispersion index AK of a final surface is smaller than 1.0, assuming that a number of the final surface is referred to as K. Here, the optical function surface means an optical surface or a diffraction surface.

$$A_k = \frac{1}{n_k \cos\beta_k}(V_{k-1}\sin\alpha_k - V_k\sin\alpha_k + n_{k-1}A_{k-1}\cos\alpha_k - m_k/p_k) \quad (1)$$

$$\text{where }, V_k = \frac{dn_k}{d\lambda}.$$

According to the virtual image display apparatus, since the absolute value of the color dispersion index value $A_K$ obtained by projecting onto a symmetric surface is smaller than or equal to a predetermined reference value, it is possible to reliably reduce color dispersion as a whole imaging system by totally handling color dispersion or color separation while securing optical performance, even in a case where refractive surfaces inclined with respect to the optical axis are provided in a plurality of positions and diffractive surface elements are provided in a plurality of positions with respect to a direction corresponding to a symmetric surface.

In a specific aspect of the invention, in the virtual image display apparatus, assuming that a wavelength of an F line is referred to as $\lambda_F$, a wavelength of a C line is $\lambda_C$, and, in each medium, a refractive index of the F line is referred to as $n_F$ and a refractive index of the C line is referred to as $n_C$, refractive index dispersion $V_K$ may be approximately given by $$V_k = \frac{dn_k}{d\lambda} \cong \frac{n_F - n_C}{\lambda_F - \lambda_C}.$$

In yet another aspect of the invention, with respect to the image light ray that is emitted from the center of the image forming device and reaches the center of the eye of an observer via the display optical system, for the image light ray and the kth optical function surface of the display optical system, assuming that an angle which is formed by a normal line of the optical function surface in a point at which the image light ray and the optical function surface intersect and an incidence light ray is referred to as $\alpha_K$, an angle which is formed by the normal line of the optical function surface and an emission light ray is referred to as $\beta_K$, a refractive index of a medium on an incidence side is referred to as $n_{k-1}$, a refractive index of a medium on an emission side is referred to as $n_k$, refractive index dispersion of the medium on the incidence side is referred to as $V_{k-1}$, refractive index dispersion of the medium on the emission side is referred to as $V_k$, a color dispersion index on the incidence side is referred to as $A_{k-1}$, a color dispersion index on the emission side is referred to as $A_k$, a target wavelength is referred to as $\lambda$ in µm unit, a diffraction order is referred to as integer $m_k$, and a pitch of a diffraction grating is referred to as $p_k$, when values of the color dispersion index $A_k$ are sequentially calculated by starting from $A_0=0$, based on following Expression (1), an absolute value of the color dispersion index $A_K$ of a final surface may be smaller than 0.3, assuming that a number of the final surface is referred to as K.

$$A_k = \frac{1}{n_k \cos\beta_k}(V_{k-1}\sin\alpha_k - V_k\sin\alpha_k + n_{k-1}A_{k-1}\cos\alpha_k - m_k/p_k) \qquad (1)$$

In this case, since the absolute value of the color dispersion index value $A_k$ in which the symmetric surface is not premised is less than 0.3, even in a case where refractive surfaces inclined with respect to the optical axis are provided in a plurality of positions and diffractive surface elements are provided in a plurality of positions, it is possible to reliably reduce color dispersion as a total imaging system by handling color dispersion or color separation as a whole while securing optical performance.

In yet another aspect of the invention, the optical function surface of the display optical system may have three or more refractive surfaces in which the value $\alpha_k$ is not zero. In this case, occurrence of lateral chromatic aberration can be suppressed by an optical system of a type in which a non-parallel refractive surface is relatively frequently used.

In yet another aspect of the invention, the optical function surface of the display optical system may have at least one non-axis symmetric free curved surface.

In yet another aspect of the invention, the optical function surface of the display optical system may have a diffractive surface.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a virtual image display apparatus in which a light guide device according to a first embodiment of the invention is incorporated will be described.

1A. Structures of Light Guide Device and Virtual Image Display Apparatus

Figure 1A:
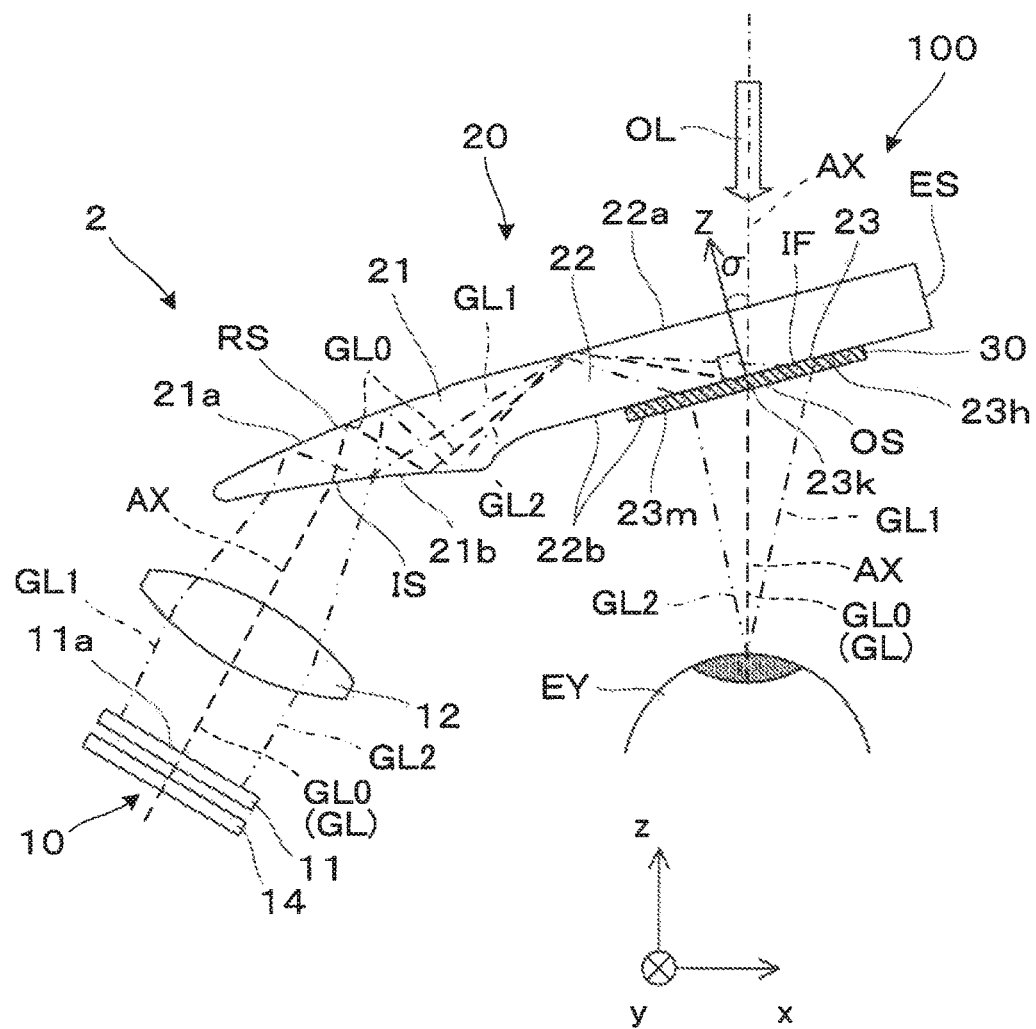
FIG. 1A is a sectional view illustrating a virtual image display apparatus according to a first embodiment.
Figure 1B:
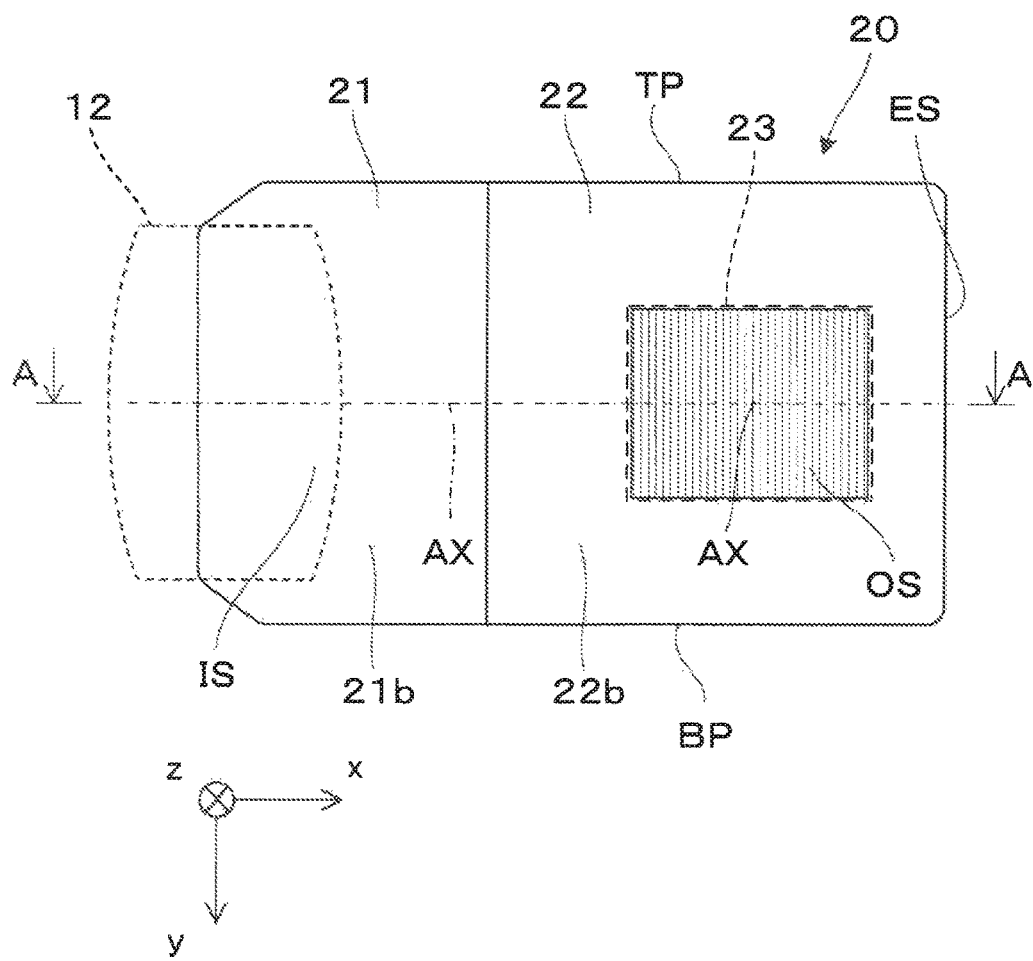
FIG. 1B is a rear surface view of a light guide device of FIG. 1A.

The virtual image display apparatus in which the light guide device according to the first embodiment will be described with reference to FIGS. 1A and 1B. The virtual image display apparatus 100 is applied to a head mounted display, and includes an image projection apparatus 10 and a light guide device 20 as one set. FIG. 1A corresponds to A-A cross section of the light guide device 20 illustrated in FIG. 1B. In addition, x, y, and z in the figure represent directions of three orthogonal coordinate axes.

The virtual image display apparatus 100 allows an observer to recognize an image as a virtual image and allows the observer to observe an external image in a see-through manner. In the virtual image display apparatus 100, a pair of the image projection apparatus 10 and the light guide device 20 is provided corresponding to each of the right eye and the left eye of a normal observer, but since the pairs are symmetric with respect to the right eye and the left eye, only the pair for the left eye is illustrated here, and illustration of the pair for the right eye is omitted. The virtual image display apparatus 100 has an external appearance (not illustrated) such as general eyeglasses as a whole.

The image projection apparatus 10 includes a liquid crystal device 11 which is an image forming device and a projection optical system 12 for light coupling. The liquid crystal device (image forming device) 11 spatially modulates an illumination light from a light source 14 to form a moving image and other image light GL to be displayed. The projection optical system 12 configures a display optical system 2 together with the light guide device 20 which will be described below. The display optical system 2 is an optical system which is surface-symmetric with respect to a lateral cross section (xz cross section) including an optical axis AX. The projection optical system 12 functions as a collimating lens that converts the image light GL emitted from each point on the liquid crystal device 11, for example, in a vertical y direction into a substantially parallel light ray, and functions as a collimating lens in cooperation with a part of the light guide device 20 with respect to a horizontal xz cross section which includes an alignment direction of eyes and in which asymmetry appears. The projection optical system 12 may function as a collimating lens in cooperation with a part of the light guide device 20 even in the vertical y direction. The projection optical system 12 is formed of glass or plastic, is not limited to one, and can be configured as a plurality of pieces. The projection optical system 12 is not limited to a spherical lens, and may include an aspherical lens, a free curved surface lens including a non-axis symmetry curved surface, and the like.

Figure 2:
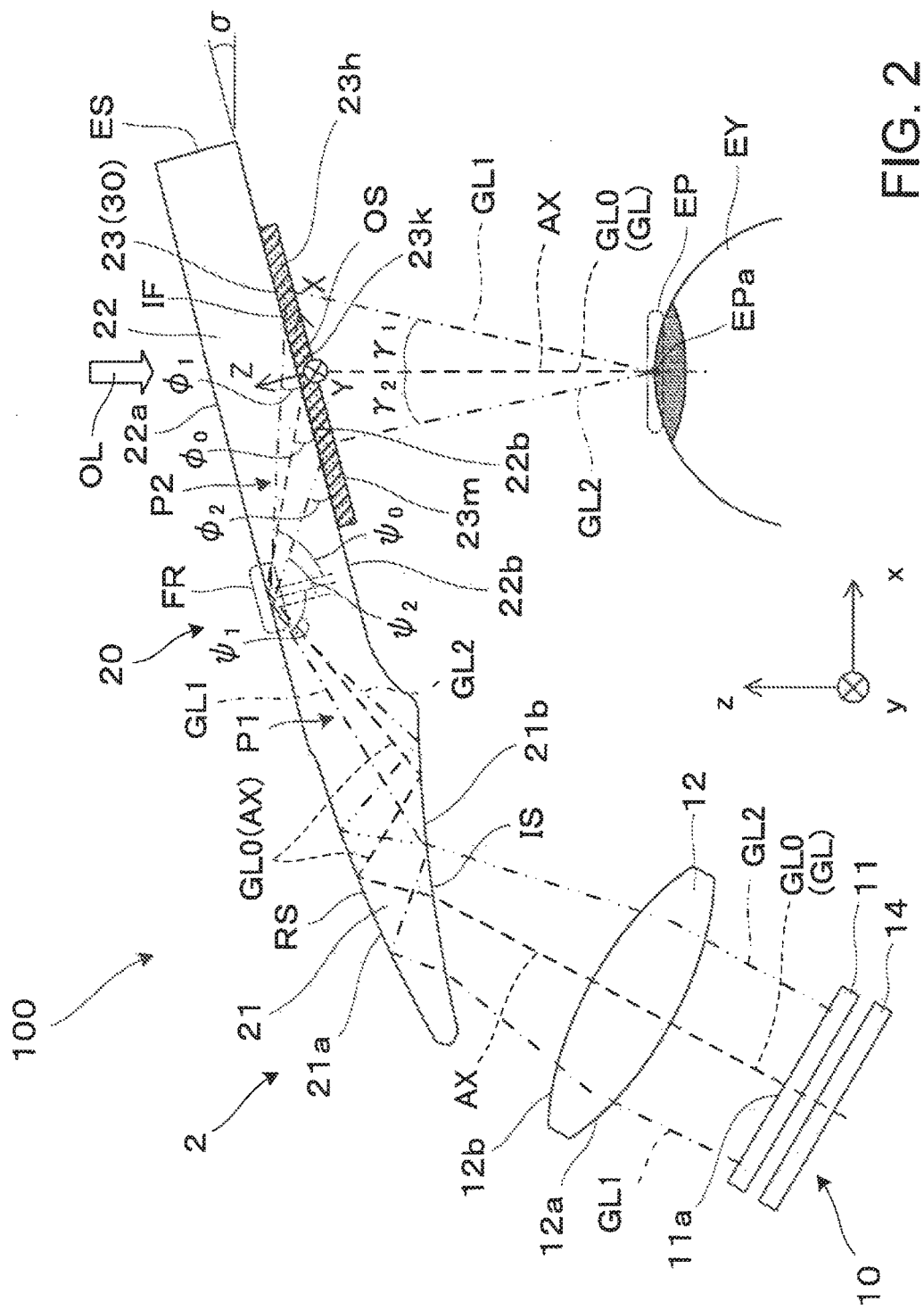
FIG. 2 is an enlarged sectional view illustrating a state of a light path in a light guide body.

As illustrated in FIG. 2 in an enlarged manner, the light guide device 20 that configures the display optical system 2 together with the projection optical system 12 emits the image light GL from the image projection apparatus 10 as virtual image light toward an eye EY of an observer, and substantially transmits an external light OL corresponding to the external image as it is. The light guide device 20 includes an incidence portion 21 for taking in image light, a parallel light guide body 22 for guiding light, and an emission portion 23 for picking up the image light. In a case of the present embodiment, the incidence portion 21 is disposed on an ear side of the observer, and the emission portion 23 is disposed on a nose side of the observer. The parallel light guide body 22 and a main body of the incidence portion 21 are an integral body or one member formed of a resin material with high light-transmissivity. The parallel light guide body 22 is disposed obliquely with respect to an optical axis AX by using the eye EY of the observer as a reference, and a normal direction Z thereof is inclined by an angle σ with respect to the optical axis AX. In this case, the parallel light guide body 22 can be disposed along a curved line of a face, but the normal line of the parallel light guide body 22 is inclined with respect to the optical axis AX. As such, in a case where the normal line of the parallel light guide body 22 is inclined by an angle σ with respect to the z direction parallel to the optical axis AX, an image light GL0 on and near the optical axis AX emitted from a reflection unit 30 forms an angle σ with respect to a normal line of a light emission surface OS.

The incidence portion 21 includes a light incidence surface IS that takes in the image light GL from the image projection apparatus 10 and a reflection surface RS that reflects the taken-in image light GL to guide into the parallel light guide body 22. The light incidence surface IS is formed on the projection optical system 12 side by a concave curved surface 21b and the curved surface 21b also has a function of totally reflecting the image light GL reflected by the reflection surface RS onto an inner surface side. The reflection surface RS is formed by a concave curved surface 21a on the projection optical system 12 side. The reflection surface RS is formed by performing aluminum evaporation or the like to form a film on the curved surface 21a, and reflects the image light GL incident from the light incidence surface IS and bends a light path in a predetermined direction, and the curved surface 21b totally reflects the image light GL reflected by the reflection surface RS and bends the light path in a predetermined direction. That is, the incidence portion 21 bends the image light GL incident from the light incidence surface IS by being reflected twice, thereby, surely coupling the image light GL with the inside of the parallel light guide body 22. Although the curved surface 21b or the curved surface 21a is a non-axis symmetric free curved surface, the curved surface is not limited to this, and can be configured by an axisymmetric free curved surface, a spherical surface, an aspheric surface, or the like. In addition, in a case where the curved surfaces 21b and 21a have refractive power in the vertical y direction, the curved surfaces can assist a collimating function of the projection optical system 12.

The parallel light guide body 22 is a flat plate portion parallel to the y axis, is inclined with respect to the x axis or the z axis, and is also called a light guide body. The parallel light guide body (light guide body) 22 has two flat surfaces 22a and 22b facing each other which are a pair of parallel extending surfaces. Since both flat surfaces 22a and 22b are parallel flat surfaces, no enlargement or no focus shift occurs with respect to an external image. In addition, the flat surface 22a on one of the +z side or the Z side functions as a total reflection surface that totally reflects image light from the incidence portion 21 and has a role of guiding the image light to the emission portion 23 with a small loss. An extended flat surface of the flat surface 22b on the rear side is a boundary surface IF between the parallel light guide body 22 and the emission portion 23. In the parallel light guide body 22, the image light GL reflected from a reflection surface RS of the incidence portion 21 and an internal side of the light incidence surface IS is incident on the flat surface 22a which is a total reflection surface, is totally reflected here, and is guided to a back side of the light guide device 20, that is, to the +x side or the +X side provided with the emission portion 23. That is, in the parallel light guide body 22, the X axis direction is a light guide direction of the image light GL. The parallel light guide body 22 has a termination surface ES as a side surface defining an end surface on the +x side or the +X side in an outer shape of the light guide device 20. In addition, the parallel light guide body 22 has an upper end surface TP and a lower end surface BP as a top surface and a bottom face respectively that define end surfaces on the ±y side.

The emission portion 23 is formed in a layer form so as to be extended along the flat surface 22b on the rear side, on the back side (+X side) of the parallel light guide body 22, or is a member formed in a layer form along the boundary surface IF. When the image light GL totally reflected by a predetermined surface region FR passes through the flat surface (total reflection surface) 22a on an outer surface of the parallel light guide body 22, the emission portion 23 reflects the incidence image light GL at a predetermined angle and bends the image light toward the light emission surface OS. Here, the image light GL, which does not pass through the emission portion 23 and is initially incident on the emission portion 23 so far, is an emission target as virtual image light. That is, even if there is light reflected by an inner surface of the light emission surface OS or the boundary surface IF, in the emission portion 23, the light is not used as image light. The emission portion 23 includes the reflection unit 30 in which a plurality of mirrors with transmissivity, and the like are arranged, but the detailed structure thereof will be described in detail below with reference to FIG. 4 and the like.

Since the light guide device 20 has the above-described structure, the image light GL that is emitted from the image projection apparatus 10 and is incident on the light guide device 20 from the light incidence surface IS is bent by being reflected plural times at the incidence portion 21, is totally reflected at a predetermined surface region FR of the flat surface 22a of the parallel light guide body 22, and proceeds substantially along the optical axis AX. The image light GL reflected at the predetermined surface region FR of flat surface 22a on the +z side or the +Z side is incident on the emission portion 23. At this time, in the XY plane, a width of the predetermined surface region FR in the longitudinal direction is narrower than a width of the emission portion 23 in the longitudinal direction. More specifically, in the XZ cross section including the optical axis AX, a ray bundle of the image light GL is narrowed as a whole at a position over two straight light paths P1 and P2 near the predetermined surface region FR, that is, near a boundary between the straight light paths P1 and P2 and thus, a beam width is narrowed. As a result, an incidence width of the light ray bundle at which the image light GL incident on the emission portion 23 (or the reflection unit 30) is wider than an incidence width at which the light ray bundle of the image light GL is incident on the predetermined surface region FR. As such, by relatively narrowing the incidence width at which the light ray bundle of the image light GL incident on the predetermined surface region FR, interference of the light path is less likely to occur, and the boundary surface IF or the light emission surface OS is not used for light guide, and thus, it is easy to make the image light GL from the predetermined surface region FR directly incident on the emission portion 23 or the reflection unit 30. In addition, the light ray bundle of the image light GL is narrowed in front of the emission portion 23, and thereby, it is easy to make a viewing angle in the horizontal direction relatively wide. The image light GL incident on the emission portion 23 is bent at an appropriate angle in the emission portion 23 or the reflection unit 30, thereby, being in a state of being able to be picked up, and being finally emitted from the light emission surface OS. The image light GL emitted from the light emission surface OS is incident on the eye EY of an observer as virtual image light. As the virtual image light forms an image on a retina of the observer, the observer can recognize the image light GL as a virtual image. Here, an angle at which the image light GL used for image formation is incident on the emission portion 23 increases as the angle is separated from the incidence portion 21 on a light source side. That is, the image light GL having a large inclination with respect to the Z direction or the optical axis AX perpendicular to the flat surface 22a on the outside is incident on the back side of the emission portion 23 and is bent at a relatively large angle, and the image light GL having a small inclination with respect to the Z direction or the optical axis AX is incident on a front side of the emission portion 23 and is bent at a relatively small angle.

1B. Light Path of Image Light

Hereinafter, a light path of an image light will be described in detail. As illustrated in FIG. 2, in the image light respectively emitted from an emission surface 11a corresponding to an image surface of the liquid crystal device (image forming device) 11, a component emitted from the center of the emission surface 11a indicated by a dashed line is referred to as image light GL0, a component emitted from the left side of paper (−x side near +z) of the periphery of the emission surface 11a indicated by a one-dotted chain line in the figure is referred to as image light GL1, and a component emitted from the right side of the paper (+x side near −z) of the periphery of the emission surface 11a indicated by a two-dotted chain line in the figure is referred to as image light GL2. Among those, a light path of the image light GL0 is defined as an optical axis AX. In a case where an emission point of the image light on the image forming device 11 is within a symmetric surface of an optical system, the image lights GL1, GL2 and GL0 are included in the symmetric surface.

Main components of the respective image lights GL0, GL1, and GL2 from the emission surface 11a of the liquid crystal device (image forming device) 11 are incident from the light incidence surface IS of the light guide device 20 after passing through the projection optical system 12, and thereafter, pass through the incidence portion 21, pass through the inside of the parallel light guide body 22, and reach the emission portion 23.

Specifically, for example, inside a symmetric surface including the optical axis AX or inside the xz plane, the image light GL0 emitted from a central portion of the emission surface 11a among the image lights GL0, GL1, and GL2 travels substantially straight on lens surfaces 12a and 12b of the projection optical system. 12. In a case where the image light GL0 is incident substantially perpendicularly to the lens surfaces 12a and 12b existing between mediums having different refractive indices, the image light GL0 is hardly bent. The image light GL0 passing through the lens surfaces 12a and 12b is bent by the incidence portion 21 of the light guide device 20, is coupled with the inside of the parallel light guide body 22, is incident on the predetermined surface region FR of the one flat surface 22a at a standard reflection angle $\psi$, is totally reflected from the predetermined surface region, is hardly reflected at the boundary surface IF between the parallel light guide body 22 and the emission portion 23 (or the reflection unit 30), passes through the boundary surface, and is directly incident on a central portion 23k of the emission portion 23. The image light GL0 is reflected at a predetermined angle in the portion 23k and is emitted from the light emission surface OS as a parallel light bundle in the optical axis AX (direction of the angle σ with respect to the Z direction) direction inclined with respect to the XY plane including the light emission surface OS.

Meanwhile, in the xz plane including the optical axis AX, a state or a direction of a light ray of the image light GL1 emitted from one end side (−x side) of the emission surface 11a is adjusted on the lens surfaces 12a and 12b of the projection optical system 12. The image light GL1 passing through the lens surfaces 12a and 12b is bent by the incidence portion 21, is coupled with inside of the parallel light guide body 22, is incident on the predetermined surface region FR of the one flat surface 22a at a maximum reflection angle $\psi 1$, is totally reflected by the predetermined surface region, is hardly reflected by the boundary surface IF between the parallel light guide body 22 and the emission portion 23 (or the reflection unit 30), passes through the boundary surface, is reflected at a predetermined angle in a portion 23h on the far side (+X side) of the emission portion 23, and is emitted from the light emission surface OS at a predetermined angle direction as a parallel light bundle. At this time, the extent in which the emission angle (corresponding to an angle γ1 in a case of using the optical axis AX as a reference) returns to the incidence portion 21 side is relatively large.

In addition, in the image light GL2 emitted from the other end side (+x side) of the emission surface 11a, a state or a direction of a light ray is adjusted by the lens surfaces 12a and 12b of the projection optical system 12. The image light GL1 passing through the lens surfaces 12a and 12b is bent by the incidence portion 21, is coupled with the inside of the parallel light guide body 22, is incident on the predetermined surface region FR of the one flat surface 22a at the minimum reflection angle $\psi 2$, is totally reflected by the predetermined surface region, is hardly reflected by the boundary surface IF between the parallel light guide body 22 and the emission portion 23 (or the reflection unit 30), passes through the boundary surface, is reflected at a predetermined angle in a portion 23m on an inlet side (–X side) in the emission portion 23, and is emitted from the light emission surface OS in a predetermined angle direction as a parallel light bundle. At this time, the extent in which the emission angle (corresponding to an angle γ2 in a case of using the optical axis AX as a reference) returns to the incidence portion 21 side is relatively small.

That is, the image lights GL0, GL1, and GL2 of various view angles are collected at a center EPa of an eye point EP assuming the eye EY of an observer. The eye point EP means a position of an emission pupil set in the light guide device 20, and if the eye EY is placed here, an image without bright defects can be obtained. The image lights GL0, GL1, and GL2 are described as representative of a part of the entire light rays of the image light GL, but light ray components configuring the other image light GL are also guided in the same manner as the image light GL0 and the like and is emitted from the light emission surface OS, and thus, illustration and description thereof are omitted.

In a case where the image lights GL0, GL1, and GL2 are obliquely incident on the lens surfaces 12a and 12b existing between mediums having different refractive indices, the image lights GL0, GL1, and GL2 are refracted and bent by the light incidence surface IS. At this time, in a case where a boundary between air and the lens of the projection optical system 12 is referred to as a first optical surface or an optical function surface (k=1), a refractive index before and after that, that is, a refractive index of a medium on an incidence side is referred to as no, a refractive index of a medium on an emission side is referred to as $n_1$, an incidence angle (an angle formed by a normal line of the lens surfaces 12a and 12b which are optical surfaces and an image light which is an incidence light ray) is referred to as $\alpha_1(°)$, and an emission angle or a refraction angle (an angle formed by a normal line of the lens surfaces 12a and 12b which are optical surfaces and image light which is an emission light ray) is referred to as $\beta_1(°)$, the following relationship is satisfied in accordance with the Snell's law.

$$\sin \beta_1 = (n_0/n_1) \times \sin \alpha_1 \quad (1\text{-}1)$$

In addition, in a case where that a boundary between a lens of the projection optical system 12 and air is referred to as a second optical surface or an optical function surface (k=2), refractive indices before and after that are referred to as $n_1$ and $n_2$, an incidence angle is referred to as $\alpha_2$, and an emission angle or a refraction angel is referred to as $\beta_2$, the following relationship is satisfied according to the Snell's law.

$$\sin \beta_2 = (n_1/n_2) \times \sin \alpha_2 \quad (1\text{-}2)$$

Figure 3:
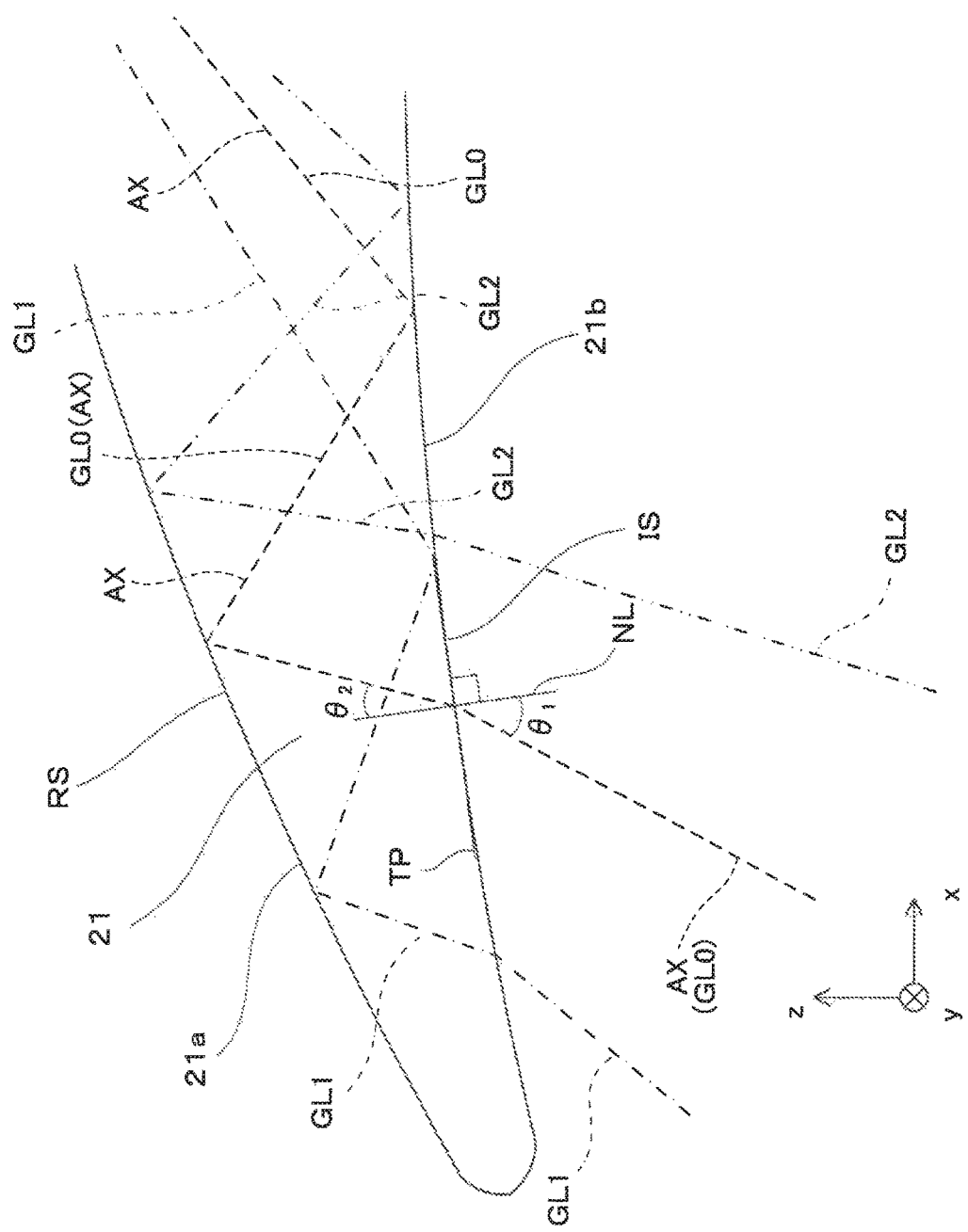
FIG. 3 is a view illustrating the light path of image light on an incidence side of the light guide device at an optical axis cross section.

As illustrated in an enlarged manner in FIG. 3, the image lights GL0, GL1, and GL2 via the projection optical system 12 are incident on the light incidence surface IS or the curved surface 21b (that is, a normal line NL of a tangent plane TP) existing between media with different refractive indices. That is, the light incidence surface IS is greatly inclined with respect to the optical axis AX. Accordingly, the image lights GL0, GL1, and GL2 propagating along the optical axis AX are refracted and bent by the light incidence surface IS. At this time, in a case where the boundary between air and a resin of the incidence portion 21 is referred to as a third optical surface or an optical function surface (k=3), refractive indices before and after that are referred to as $n_2$ and $n_3$, an incidence angle is referred to as $\alpha_3$, and an emission angle or a refraction angle is referred to as $\beta_3$, the following relationship is satisfied according to the Snell's law.

$$\sin \beta_3 (n_2/n_3) \times \sin \alpha_3 \quad (1\text{-}3)$$

Here, if n=1.4 as an example of a value of a refractive index n of a transparent resin material used for the incidence portion 21 and the parallel light guide body 22, a value of a critical angle ψc thereof becomes ψc≈45.6°. By setting a minimum reflection angle ψ2 among the reflection angles ψ0, ψ1, and ψ2 of the respective image lights GL0, GL1, and GL2 to a value larger than the critical angle ψc, it is possible to satisfy the total reflection condition on the flat surface 22a in the parallel light guide body 22 for necessary image light.

The image light GL0 toward the center is incident on the portion 23k of the emission portion 23 at an elevation angle φ0 (=90°−ψ0), the image light GL1 toward the periphery is incident on the portion 23h of the emission portion 23 at an elevation angle φ1 (=90°−ψ1), and the image light GL2 toward the periphery is incident on the portion 23m of the emission portion 23 at an elevation angle φ2 (=90°−ψ2). Here, a relation of φ2>φ0>φ1 is established between the elevation angles φ0, φ1, and φ2 by reflecting a magnitude relationship of the reflection angles ψ0, ψ1, and ψ2. That is, an incidence angle ι (see FIG. 4 which will be described below) of the reflection unit 30 to the mirror 31 gradually decreases in the order of the portion 23m corresponding to the elevation angle φ2, the portion 23k corresponding to the elevation angle φ0, and the portion 23h corresponding to the elevation angle φ1. In other words, the farther apart from the incidence portion 21, the more the incidence angle ι on the mirror 31 or a reflection angle at the mirror 31 decreases. The incidence angle ι of the image lights GL0, GL1, and GL2 on the mirror 31 becomes 40° or more from the viewpoint of being able to reduce the number of times of passing through the mirror 31. Thereby, in a stage where the image light GL from the incidence portion 21 side is incident on the reflection unit 30 and is incident on the first mirror 31 or the adjacent mirror 31, it is easy to adopt a configuration in which the image light GL is reflected by the mirror 31 and is picked up to the eye EY side.

1C. Structure of Emission Portion and Bending of Light Path by Emission Portion

Hereinafter, a structure of the emission portion 23 and bending of a light path of image light by the emission portion 23 will be described in detail with reference to FIGS. 2 and 4.

First, the structure of the emission portion 23 will be described. The emission portion 23 includes the reflection unit 30 configured by arranging a plurality of mirrors 31 which are a plurality of reflection surfaces that partially reflect the image light GL. The reflection unit 30 is a member of a rectangular plate shape extending along the XY plane inclined by an angle σ with respect to the optical axis AX, and has a structure in which many mirrors (reflection surfaces) 31 of a thin band shape are buried so as to form a stripe pattern. That is, the reflection unit 30 is configured by arranging many thin and long mirrors 31 extending in the y direction or the Y direction in a direction in which the parallel light guide body 22 extends, that is, in the X direction. More specifically, the mirrors 31 extend linearly in a direction perpendicular to the X direction which is parallel to the flat surfaces 22a and 22b of the parallel light guide body 22 illustrated in FIG. 2 and in which the mirrors 31 are arranged, that is, using the vertical y direction or Y direction as a longitudinal direction. Furthermore, the mirrors 31 are inclined toward the incidence portion 21 toward the outside using an observer side of the parallel light guide body 22 as a reference. More specifically, the mirrors 31 are inclined such that an upper end (+Z side) rotates counterclockwise with respect to the YZ plane orthogonal to the flat surfaces 22a and 22b by using the longitudinal direction (Y direction) as an axis. Further, all the mirrors 31 are arranged in parallel to each other.

The reflection unit 30 has a structure in which many glass members or block members 32 are joined together, and the mirror (reflection surface) 31 is a thin film type mirror interposed between a pair of adjacent block members (glass members) 32. Here, a refractive index of the block member 32 is different from a refractive index of the parallel light guide body 22. Accordingly, an angle δ at which the mirror 31 is inclined is adjusted or corrected in consideration of the difference in refractive index.

A reflectance of the mirror 31 with respect to the image light GL is higher than or equal to 10% and lower than or equal to 50% in an incidence angle range of the assumed image light GL from the viewpoint of easy observation of the external light OL by see-through. The reflectance of the mirror 31 with respect to the image light GL in the specific example is set to, for example, 20%, and a transmittance with respect to the image light GL is set to, for example, 80%.

A thickness TI of the reflection unit 30 is set to approximately 0.7 mm to 3.0 mm. A thickness of the parallel light guide body 22 supporting the reflection unit 30 is, for example, approximately several mm to 10 mm, and is preferable to be approximately 4 mm to 6 mm. If the thickness of the parallel light guide body 22 is sufficiently larger than the thickness of the reflection unit 30, the incidence angle of the image light GL on the reflection unit 30 or the boundary surface IF can be easily reduced, and reflection at the mirror 31 at a position where the image light GL is not taken into the eye EY is easily suppressed. Meanwhile, if the thickness of the parallel light guide body 22 is relatively thin, weights of the parallel light guide body 22 and the light guide device 20 are easily reduced.

The mirrors 31 are all set to have the same inclination, can form an inclination angle δ of, for example, approximately 48° to 70° clockwise with respect to the boundary surface IF with the parallel light guide body 22, and specifically, form an inclination angle δ of, for example, 60°. Here, it is assumed that the elevation angle φ0 of the image light GL0 is set to, for example, 30°, the elevation angle φ1 of the image light GL1 is set to, for example, 22°, and the elevation angle φ2 of the image light GL2 is set to, for example, 38°. In this case, the image light GL1 and the image light GL2 are incident on the eye EY of an observer at an angle γ1=γ2≈12.5° with respect to the optical axis AX.

Thereby, in a case where a component (image light GL1) having a relatively large total reflection angle of the image light GL is mainly incident on the portion 23h side on the +X side which is an incidence side opposite to the reflection unit 30, and a component (image light GL2) having a relatively small total reflection angle is mainly incident on the portion 23m side on the −X side which is an incidence side of the emission portion 23, the image light GL can be efficiently picked up in an angle state of being collected into the eye EY of an observer as a whole. Since a configuration is provided in which the image light GL is picked up with such an angle relationship, the light guide device 20 can make the image light GL pass through the reflection unit 30 only once, without making the image light GL pass through the reflection unit 30 a plurality of times as a rule, and can pick up the image light GL as virtual image light with less loss.

Nonuse light passing through the mirror 31 of the reflection unit 30 can be incident again on the flat surface 22a on the outside, but in a case where the light is totally reflected here, and in many cases, the light can be incident on a region other than an effective region in the portion 23h on the back side of the reflection unit 30 or further on the back side, and a possibility that the light is incident on the eye EY is reduced.

In addition, on the center side or the portions 23k and 23h and the like on the back side of the reflection unit 30, a part of the image light GL passes through (more specifically, one reflection and passing-through including one or more transmissions) the mirror 31 a plurality of times. In this case, the number of times of passing through the mirror 31 is plural, but the reflection light from the plurality of mirrors 31 is incident on the eye EY of an observer as the image light GL, and thereby, loss of the amount of light is not too large.

An arrangement interval SP in an arrangement direction of the plurality of mirrors 31 or the Z direction in which the reflection unit 30 extends changes such that a plurality of mirrors 31 are connected substantially in succession with respect to a line of sight extending from a center EPa (see FIG. 2) of the eye point EP set by assuming the eye EY of an observer to any point of interest, from an incidence side close to the incidence portion 21 to a side opposite to the incidence side close to a termination surface ES. As a result, the arrangement interval SP between the plurality of mirrors 31 in the reflection unit 30 gradually increases from the incidence side close to the incidence portion 21 to the side opposite to the incidence side. The specific arrangement interval SP between the mirrors 31 is within a range of approximately 0.5 mm to 2.0 mm in each portion since there is a difference in size in the reflection unit 30.

Figure 4:
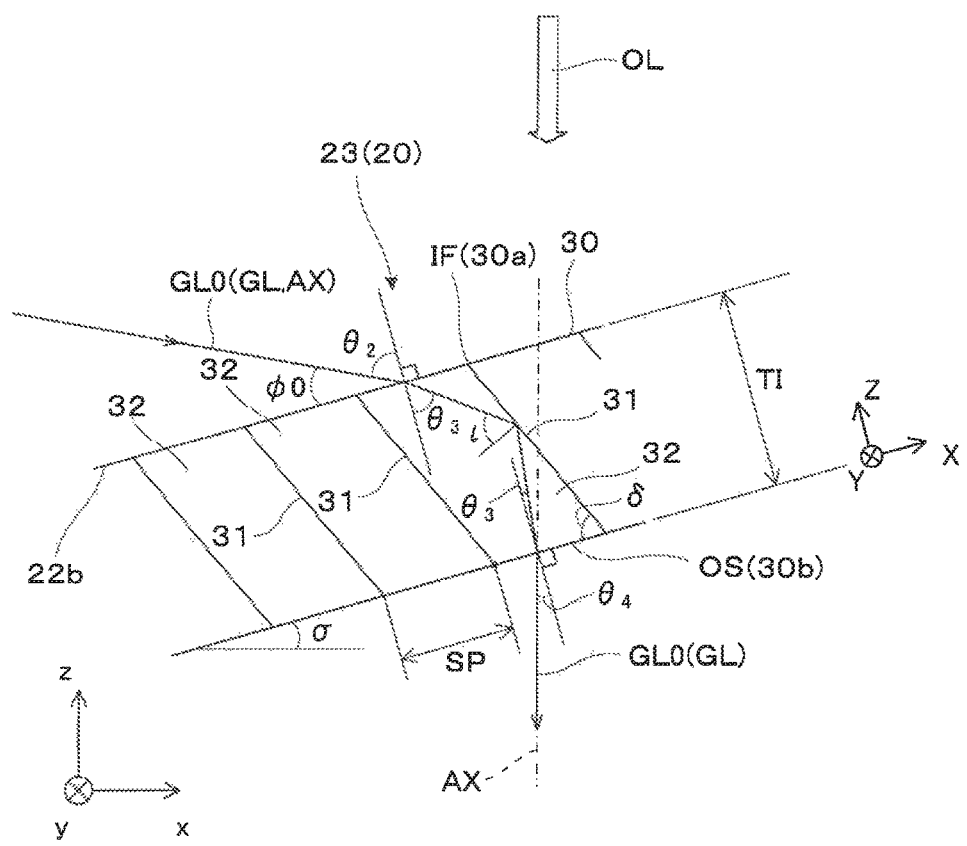
FIG. 4 is a partial enlarged view illustrating arrangement of mirrors and the like in a central portion of a reflection unit at the optical axis cross section.

Referring to FIG. 4, the image lights GL0, GL1, and GL2 passing through the parallel light guide body 22 in the XZ plane including the optical axis AX are incident obliquely on the boundary surface IF existing between mediums having different refractive indices. That is, the boundary surface IF is greatly inclined with respect to the optical axis AX. Accordingly, the image lights GL0, GL1, and GL2 propagating along the optical axis AX are refracted and bent by the boundary surface IF. At this time, in a case where a boundary between a resin medium of the incidence portion 21 and glass or resin of the block member 32 is referred to as a fourth optical surface or an optical function surface (k=4), refractive indices before and after that are referred to as $n_3$ and $n_4$, an incidence angle is referred to as $α_4°$, and an emission angle or a refraction angle is referred to as $β_4°$, the following relationship is satisfied according to the Snell's law.

$$\sin β_4 = (n_3/n_4) \times \sin α_4 \qquad (1\text{-}4)$$

In addition, the image light GL0 passing through the boundary surface IF propagates along the optical axis AX in the XZ plane including the optical axis AX, is reflected by the mirror 31, and thereafter, is incident obliquely on the light emission surface OS existing in mediums having different refractive indices. That is, the light emission surface OS is not a surface perpendicular to the optical axis AX and is inclined with respect to the optical axis. Accordingly, the image light GL0 propagating along the optical axis AX is refracted and bent by the light emission surface OS. At this time, in a case where a boundary between glass or resin of the block member 32 and air is referred to as a fifth optical surface or an optical function surface (k=5), refractive indices before and after that are referred to as $n_4$ and $n_5$, the incidence angle is referred to as $\alpha_5$, and an emission angle or a refraction angle is referred to as $\beta_5$, the following relationship is satisfied according to the Snell's law.

$$\sin \beta_5 = (n_4/n_5) \times \sin \alpha_5 \tag{1-5}$$

Figure 5:
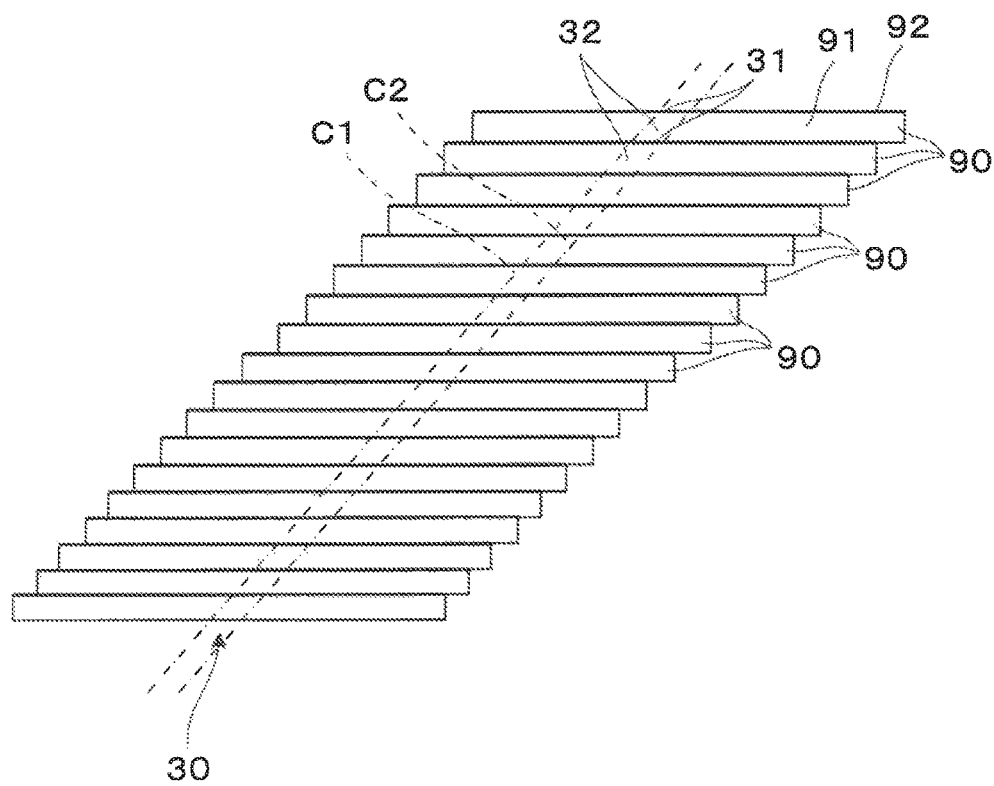
FIG. 5 is a view illustrating one manufacture example of the reflection unit.

An example of a manufacturing method of the reflection unit 30 will be described with reference to FIG. 5. Many glass plates 91, which are parallel flat plates formed of glass, are prepared in advance. A thickness of each glass plate 91 is configured in consideration of the arrangement interval SP of the mirrors 31, as the thickness of the glass plate 91 corresponding to the portion 23k on a central side of the reflection unit 30 is set as a standard, the glass plate 91 corresponding to the portion 23m on an incidence side or an inlet side is relatively thin, and the glass plate 91 corresponding to the portion 23h on a side opposite to the incidence side or the back side is relatively thick. In a case of FIG. 5, the glass plate 91 on a lower side is thin and the glass plate 91 on an upper side is thick. Thereafter, many element plates 90 are prepared by forming a reflection film 92 which is a metal reflection film or a dielectric multilayer film on one surface of the prepared many glass plates 91. Thereafter, the formed many element plates 90 are stacked while being bonded with an adhesive in the order of thickness, and the whole is obliquely cut along cutting lines C1 and C2. Thereby, it is possible to obtain the reflection unit 30 having a structure in which a mirror 31 formed of a metal reflecting film or a dielectric multilayer film is interposed between the block members 32 which are thin and long prism pieces obtained by obliquely dividing a parallel flat plate, and an arrangement interval between the mirrors 31 is narrow on one end side and the arrangement interval between the mirrors 31 is wide on the other end side. The reflection unit 30 is fixed to an appropriate place of the parallel light guide body 22 on the observer side by adhering using an adhesive and then curing the adhesive.

Color dispersion or color separation as lateral chromatic aberration of the image light GL occurring in the entire optical system of the virtual image display apparatus 100 such as the light guide device 20 will be described. In the entire optical system, that is, the display optical system 2, the image light GL is refracted and bent a plurality of times between media having different refractive indices. Specifically, the image lights GL0, GL1, and GL2 are basically refracted by the lens surfaces 12a and 12b, the light incidence surface IS, the boundary surface IF, and the light emission surface OS, and the refractive surfaces (lens surfaces 12a and 12b, the light incidence surface IS, the boundary surface IF, and the light emission surface OS) are basically inclined or not perpendicular to the optical axis AX. In addition, the refractive surfaces 12a, 12b, IS, IF, and OS are mostly not parallel to each other with respect to the optical axis AX. If the optical axis AX is not taken as a reference, the two refractive surfaces IF and OS are parallel in external appearance.

As described above, the refraction at the lens surfaces 12a and 12b of the projection optical system 12 is represented by the relational expression (1-1) or (1-2). In addition, the refraction at the light incidence surface IS of the light guide device 20 is represented by the relational expression (1-3), the refraction at the boundary surface IF is represented by the relational expression (1-4), and the refraction at the light emission surface OS is represented by the relational expression (1-5). In general, in a case where a refractive index (that is, a refractive index of a medium on an incidence side) of a kth (k is a natural number) medium along a light path is referred to as $n_{k-1}$, a refractive index (that is, the refractive index of a medium on an emission side) of a (k+1)th medium is referred to as $n_k$, an incidence angle (an angle formed by a normal line of an optical surface and image light which is an incidence light ray) is referred to as $\alpha_k$, and an emission angle (an angle formed by the normal line of the optical surface and the image light which is an emission light ray) is referred to as ok, the following relational expression (2-1) is satisfied.

$$n_{k-1} \times \sin \alpha_k = n_k \times \sin \beta_k \tag{2-1}$$

A refractive surface between the respective media is inclined variously with respect to a light path or an optical axis. As a result, the incidence angle and the emission angle on a series of refractive surfaces change greatly. In the examples of FIGS. 2 and 3, the image lights GL0, GL1, and GL2 are assumed to be on the xz plane or a symmetric surface, but even in a case where the image light GL is not on the xz plane or the symmetric surface, the relational expression (2-1) is satisfied.

Here, in the respective refractive surfaces of the light incidence surface IS, the boundary surface IF, and the light emission surface OS, color dispersion or color separation as lateral chromatic aberration occurs along with refraction. By successively calculating color dispersion indices on the refractive surfaces and accumulating the values, the color dispersion index (that is, a cumulative value of the color dispersion indices) can be evaluated as the entire optical system.

If the above-described relational expression (2-1) is differentiated by using a wavelength $\lambda$, $\sin \alpha_k \times (dn_{k-1}/d\lambda) + N_{k-1} \cos \alpha_k \times (d\alpha_k/d\lambda) = \sin \beta_k \times (dn_k/d\lambda) + N_k \cos \beta_k \times (d\beta_k/d\lambda)$ is obtained. Here, assuming that $V_{k-1} = dn_{k-1}/d\lambda$ and $V_k = dn_k/d\lambda$ and $A_{k-1} = d\alpha_k/d\lambda$ and $A_k = d\beta_k/d\lambda$, the above expression becomes as follows.

$$A_k = \frac{1}{n_k \cos \beta_k} (V_{k-1} \sin \alpha_k - V_k \sin \beta_k + n_{k-1} A_{k-1} \cos \alpha_k) \tag{2-2}$$

In the relational expression (2-2), the values $V_{k-1}$ and $V_k$ indicate wavelength dependency of a refractive index, and the value $A_{k-1}$ and $A_k$ indicate a color dispersion index, that is, the degree of color dispersion or color separation. $A_0 = d\theta_0/d\lambda$ as an initial value is assumed to be zero. If refractive surfaces are sequentially traced, assuming that a number of the final surface is K, the relational expression (2-2) means that values up to the absolute value (in this case, K is the number of the final surface and indicates a fifth surface, that is, a boundary between glass or resin and air in the present embodiment) of the color dispersion index $A_K$ of the final surface can be estimated. At this time, the color dispersion indices $A_k = d\beta_k/d\lambda$ are sequentially calculated by using $V_{k-1} = dn_{k-1}/d\lambda$, $V_k = dn_k/d\lambda$, and the like, whenever passing through a refractive surface between a series of media, that is, at each bending point along the optical axis AX. The value $V_k$ is wavelength dependence of a refractive index of a medium on an incidence side of a refractive surface and can be approximated by a value (nb−nr)/($\lambda$b−$\lambda$r), for example, assuming that a wavelength range of visible light is $\lambda$b to $\lambda$r ($\mu$m) and a refractive index range of a medium of interest is nb to nr. Specifically, in a case where a wavelength of an F line that is widely used as a standard of refractive index characteristics of an optical medium is referred to as $\lambda_F$ ($\mu$m), a wavelength of a C line is referred to as $\lambda_C$ ($\mu$m) and in the medium of interest, a refractive index of the F line is referred to as $n_F$ and a refractive index of the C line is referred to as $n_C$, a value $V_k = dn_k/d\lambda$ can be obtained by using the following expression.

$$\frac{dn_k}{d\lambda} = \frac{n_F - n_C}{\lambda_F - \lambda_C} \quad (2\text{-}3)$$

The color dispersion index $A_K$ is cumulatively determined by sequentially tracking mediums using the initial value $A_0$ (deg/μm), $V_k = dn_k/d\lambda$ (1/μm), and the like. That is, assuming that a number of the final surface is K, when values of the color dispersion index $A_K$ are calculated sequentially by starting from $A_0 = 0$, an absolute value of the color dispersion index $A_K$ of the final surface is obtained by estimating an index value or a cumulative value of the final color dispersion viewed from the entire optical system, and it is preferable to be less than or equal to a predetermined reference value. In the example using the F line and the C line as described above, an angular size of the final color dispersion is given by $0.17 \times A_K$ [deg], assuming that a wavelength difference between the F line and the C line is approximately 170 nm=0.17 μm. In the above description, an example using the F line and the C line is described, but it goes without saying that other wavelengths can be used as a reference.

In a case where the final color dispersion index $A_K$ is 0.3, an angle difference is $0.17 \times 0.3 = 0.051$ (degrees)=3.06 (minutes). Accordingly, in a case where an angular difference is intended to suppress to 3.06 (minutes) from the viewpoint of securing clearness of a displayed image, it is necessary to set an absolute value of the color dispersion index value $A_K$ to a value less than or equal to 0.3.

If limitation on the absolute value of the final color dispersion index $A_K$ is not established even with respect to a certain light ray other than a main light ray (a light ray from the center of a light source to the center of the eye EY or the eye point EP), the displayed image is not clear. However, it is hard to simply calculate the color dispersion index $A_K$ for a certain light ray. Since the color dispersion index $A_K$ represents a change in an angle of a light ray in a flat surface including the light ray and a normal line of the flat surface, in a case where the flat surface (light ray surface) including the light ray and the normal line on each refractive surface are parallel to each other, the color dispersion index $A_K$ of a certain flat surface on an emission side and the color dispersion index AK of the next surface on an incidence side are the same, and thus, calculation can be sequentially performed, but in a case where the respective light ray surfaces are not parallel to each other, the color dispersion indices are different from each other, and strictly speaking, conversion is required.

Accordingly, in the present embodiment, an optical system that is surface-symmetric with respect to one flat surface or a symmetric surface (specifically, a lateral cross section (XZ cross section) including the optical axis AX) is assumed, and a light ray and a normal line which are projected to the flat surface or the symmetric surface are considered. The Snell's law is approximately applied to an angle between lines obtained by projecting an incidence light ray, an emission light ray, and a normal line of a surface on the respective refractive surfaces onto the symmetric surfaces. In this case, since the final color dispersion index $A_K$ represents an angular dispersion within a symmetric flat surface of an optical system, the color dispersion index $A_k$ of a certain surface on an emission side and the color dispersion index $A_k$ of the next surface on an incidence side are the same as each other, and it is easy to proceed sequential calculation.

Specifically, an angle between a line obtained by projecting a normal line of a surface at a point at which the image light GL intersects with the kth optical surface or optical function surface of a display optical system (that is, the display optical system 2) onto a symmetric surface of the display optical system and a line obtained by projecting an incidence light ray onto the symmetric surface is referred to as $\alpha_K$, an angle between the line obtained by projecting the normal line of the optical surface or the optical function surface onto the symmetric surface and the line obtained by projecting an emission light ray onto the symmetric surface is referred to as $\beta_K$, a refractive index of a medium on an incidence side is referred to as $n_{K-1}$, a refractive index of a medium on an emission side is referred to as $n_K$, a refractive index dispersion of the medium on the incidence side is referred to as $V_{K-1}$, a refractive index dispersion of the medium on the emission side is referred to as $V_K$, a color dispersion index of the medium on the incidence side is referred to as $A_{K-1}$, a color dispersion index on the emission side obtained by projection onto the symmetric surface is referred to as $A_K$, and a target wavelength is referred to as $\lambda$ (μm), when values of the color dispersion indices $A_K$ (deg/μm) are sequentially calculated by starting from $A_0=0$ (deg/μm), based on the following expression (2-4), it is preferable that the color dispersion index $A_K$ of the final surface obtained by projection onto a symmetric surface is less than or equal to a predetermined reference value assuming that a number of the final side is K.

$$A_k = \frac{1}{n_k \cos\beta_k}(V_{k-1}\sin\alpha_k - V_k\sin\beta_k + n_{k-1}A_{k-1}\cos\alpha_k) \quad (2\text{-}4)$$

In this case, since the Snell's law is only approximately established, there is a possibility of generating an error, and thus, a desirable purpose is to set an absolute value of the color dispersion index $A_K$ obtained by projecting onto the symmetric surface to a value smaller than or equal to 1.0.

Hereinafter, examples based on a specific optical system will be described. Meaning of symbols used in the respective examples are as follows.

STOP: diaphragm surface corresponding to eye
PLANE: flat surface in front of eye or image surface
IMAGE: image surface
MA: mirror array
PSi: flat surface (i=surface number of same surface)
FFSj: free curved surface (j=surface number of same surface)
ASPk: spherical surface or flat surface (k=surface number of same surface)
T: interval between surfaces on axis
TLY: inclination angle(° of optical axis in lateral cross section (XZ cross section) of specific surface (there is a case of changing at front and rear of specific surface with respect to TLY)
DCX: Amount of shift of optical axis in X axis direction in lateral cross section (XZ cross section) of specific surface Data on optical surfaces of a specific optical system common to Examples 1 to 3 is illustrated in Table 1 below. For example, symbols PS1 and FFS2 represent the flat surfaces 22a and 22b of the parallel light guide body 22, and symbols FFS1 and FFS2 represent the reflection surface RS and the light incidence surface IS of the incidence portion 21. Symbols ASP1 to ASP6 represent lens surfaces of a projection lens 12.

TABLE 1

| No | Name | T | Medium |
|----|------|------|--------|
| 1 | STOP | 20.00 | Air |
| 2 | PLANE | 0.50 | BK7 |
| 3 | MA | −0.50 | Air |
| 4 | PS1 | −5.00 | COP |
| 5 | PS2 | 14.00 | |
| 6 | FFS1 | −7.00 | COP |
| 7 | FFS2 | 7.00 | |
| 8 | FFS1 | 7.00 | Air |
| 9 | ASP1 | 12.00 | COP |
| 10 | ASP2 | 1.50 | Air |
| 11 | ASP3 | 1.00 | PC |
| 12 | ASP4 | 2.00 | Air |
| 13 | ASP5 | 6.00 | COP |
| 14 | ASP6 | 5.60 | Air |
| 15 | PLANE | 1.10 | SLICA |
| 16 | IMAGE | | |

Air, BK7, COP, PC, and SLICA in Table 1 described above are medium names, and medium data of each medium is illustrated in following Table 2.

TABLE 2

| Medium | F 0.486133 | d 0.587562 | C 0.656273 | V |
|--------|------------|------------|------------|---|
| Air | 1 | 1 | 1 | 0 |
| BK7 | 1.5224 | 1.5168 | 1.5143 | −0.0473 |
| COP | 1.5319 | 1.5253 | 1.5225 | −0.0552 |
| PC | 1.5994 | 1.5855 | 1.5799 | −0.1151 |
| SILICA | 1.4631 | 1.4585 | 1.4564 | −0.0397 |

In the table, a symbol F means an F-line refractive index, a symbol d means a d-line refractive index (nd), and a symbol C means a C-line refractive index. In addition, a symbol V means a refractive index dispersion.

An optical axis inclination angle (tilt) TLY and an optical axis shift amount (decenter) DCX in a lateral cross section of an optical surface in a prism configuring a specific optical system common to Examples 1 to 3 are illustrated in following Table 3.

TABLE 3

| No | Name | TLY (front of surface) | DCX (rear of surface) | TLY (rear of surface) |
|----|------|------|------|------|
| 2 | PLANE | 15.00 | 0.0 | 0.00 |
| 5 | PS2 | 0.00 | 11.8 | 65.08 |
| 6 | FFS1 | −54.00 | 0.0 | −54.00 |
| 7 | FFS2 | 36.48 | 0.0 | −36.48 |
| 8 | FFS1 | 54.00 | 7.0 | 32.38 |

Coefficients $Ak_{m,n}$ obtained by polynomial expansion of a free curved surface among the optical surfaces configuring a specific optical system common to the first to third examples are illustrated in following Table 3. In Table 4, symbols m and n mean variables or orders of the coefficients $Ak_{m,n}$. Here, the coefficients $Ak_{m,n}$ mean coefficients of each term $X^m \cdot Y^n$ configuring the polynomial representing the kth surface which is a target. That is, the kth surface is represented by $Z=\Sigma\{Ak_{m,n} \cdot (X^m \cdot Y^n)\}$.

TABLE 4

| m | n | FFS1 | FFS2 |
|---|---|------|------|
| 2 | 0 | 4.025E−03 | 6.215E−03 |
| 0 | 2 | 6.136E−03 | 6.836E−03 |
| 3 | 0 | 2.529E−05 | 6.218E−05 |
| 1 | 2 | 1.150E−05 | 2.657E−05 |
| 4 | 0 | 2.362E−06 | 3.504E−06 |
| 2 | 2 | 1.238E−06 | 2.624E−06 |
| 0 | 4 | 4.822E−06 | 4.171E−06 |
| 5 | 0 | 0.000E+00 | 5.012E−08 |
| 3 | 2 | 0.000E+00 | −5.990E−08 |
| 1 | 4 | 0.000E+00 | 4.723E−08 |
| 6 | 0 | 0.000E+00 | 7.769E−08 |
| 4 | 2 | 0.000E+00 | −2.522E−09 |
| 2 | 4 | 0.000E+00 | −6.814E−09 |
| 0 | 6 | 0.000E+00 | −4.870E−09 |

Coefficients Bi (i=2, 4, 6, . . . ) obtained by polynomial expansion of a cross-sectional shape of an aspherical surface among the optical surfaces configuring the specific optical system common to Examples 1 to 3 are illustrated in following Table 5. That is, the aspherical surface is represented by $Z=\Sigma Bi \cdot r^i$ assuming that $r^2=X^2+Y^2$.

TABLE 5

| | ASP1 | ASP2 | ASP3 |
|---|------|------|------|
| B2 | 4.088E−02 | −2.844E−02 | −5.546E−02 |
| B4 | 4.789E−05 | 7.964E−05 | 3.746E−04 |
| B6 | 1.379E−07 | 7.442E−08 | −1.359E−06 |
| B8 | 6.850E−10 | −7.115E−10 | 2.222E−09 |

| | ASP4 | ASP5 | ASP6 |
|---|------|------|------|
| B2 | 4.503E−02 | 6.674E−02 | −1.370E−02 |
| B4 | −2.053E−04 | −3.603E−06 | 1.003E−03 |
| B6 | 1.234E−06 | −2.773E−06 | −1.894E−05 |
| B8 | 5.199E−08 | 2.982E−09 | 1.120E−07 |

Figure 6A:
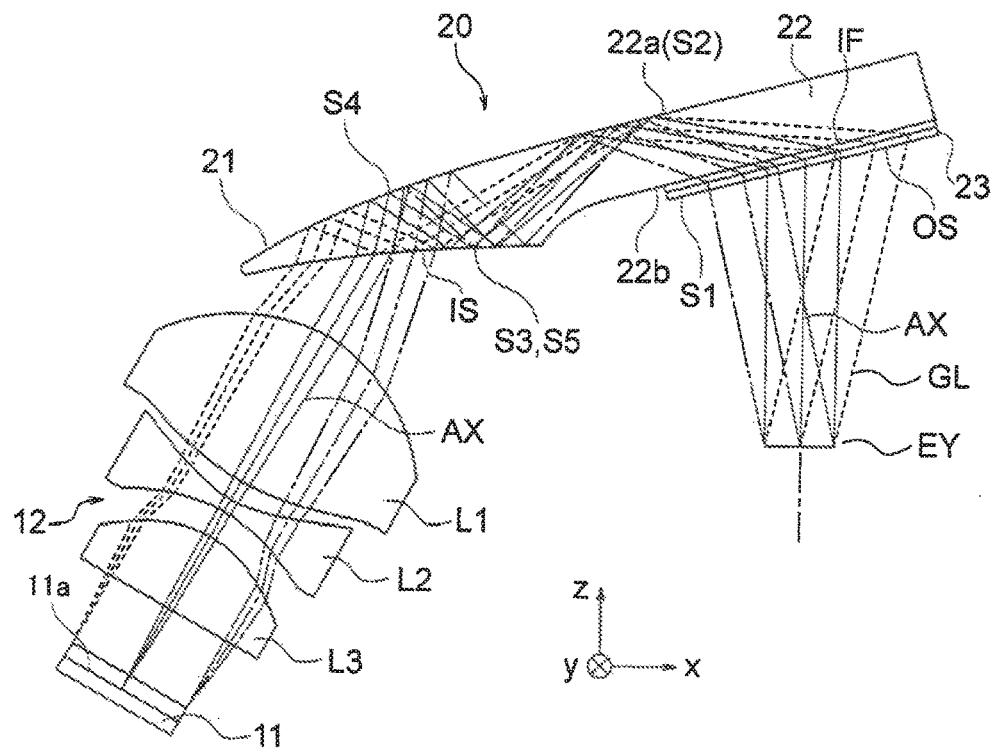
FIG. 6A is a sectional view illustrating an optical system of Example 1.

FIG. 6A is a sectional view of the light guide device 20 and the projection lens 12 according to the first embodiment. The projection lens 12 is configured by three lenses L1 to L3. The light guide device 20 has first and second surfaces S1 and S2 as a pair of flat surfaces 22a and 22b of the parallel light guide body 22. The flat surface 22a or the first surface S1 corresponds to the light emission surface OS. The light guide device 20 includes a third surface S3 which is a free curved surface and has a relatively weak negative refractive power in a cross section and a fourth surface S4 which is a free curved surface and has a relatively weak positive refractive power in a cross section, and a fifth surface S5 which is a transmission surface common to the third surface S3, in the incidence portion 21. Here, the fifth surface S5 corresponds to the light incidence surface IS. By providing the free curved surface in the incidence portion 21 as in the present embodiment, a burden on the projection lens can be reduced, and as a result, the optical system can be thinned.

Figure 6B:
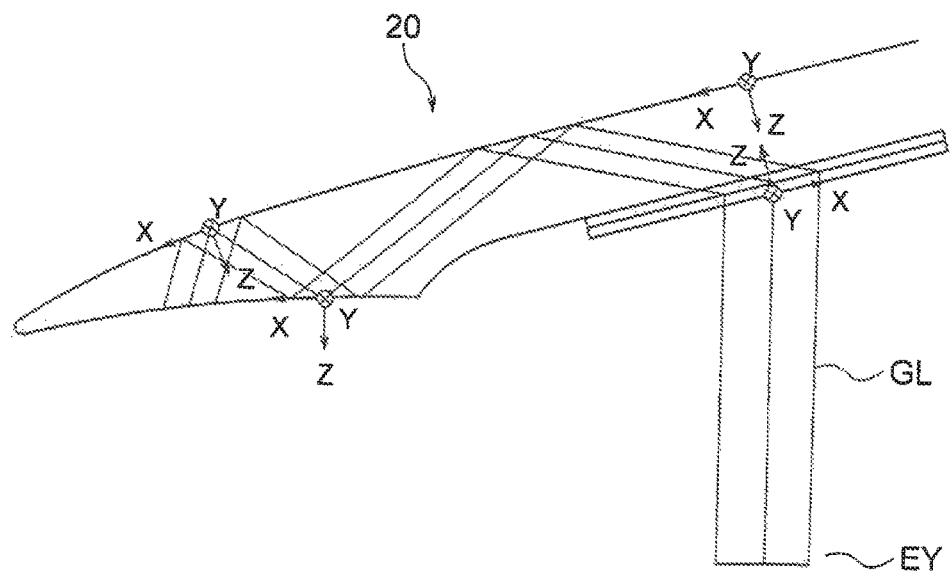
FIG. 6B is a sectional view illustrating local coordinates of an optical surface illustrated in FIG. 6A.

FIG. 6B specifically illustrates local coordinates of the first to fifth surfaces S1 to S5 configuring the light guide device 20.

Example 1

Hereinafter, optical data in the light path of Example 1 will be described with reference to Table 6. The optical data of Example 1 corresponds to light emitted from a central point (x=0, y=0) of the liquid crystal device 11, and a light ray and a normal line of each surface are all included in a symmetric surface of the optical system.

TABLE 6

| k | A | α | β | Glass material | nd | V |
|---|---|---|---|---|---|---|
| 0 | 0 | — | — | Air | 1.0 | 0.0 |
| 1 | 0.0 | 0.0 | 0.0 | SILICA | 1.4585 | −0.0397 |
| 2 | 0.0 | 0.0 | 0.0 | Air | 1.0 | 0.0 |
| 3 | 0.0 | 0.0 | 0.0 | COP | 1.5253 | −0.0552 |
| 4 | 0.0 | 0.0 | 0.0 | Air | 1.0 | 0.0 |
| 5 | 0.0 | 0.0 | 0.0 | PC | 1.5855 | −0.1151 |
| 6 | 0.0 | 0.0 | 0.0 | Air | 1.0 | 0.0 |
| 7 | 0.0 | 0.0 | 0.0 | COP | 1.5253 | −0.0552 |
| 8 | 0.0 | 0.0 | 0.0 | Air | 1.0 | 0.0 |
| 9 | 0.866 | 36.02 | 22.68 | COP | 1.5253 | −0.0552 |
| 10 | 0.261 | 65.11 | 65.81 | BK7 | 1.5168 | −0.0473 |
| 11 | −0.075 | 9.82 | 15.00 | Air | 1.0 | 0.0 |

In the table, a column A indicates a value of the color dispersion index $A_K$ corresponding to a column k, a column α indicates a value αx of an incidence angle corresponding to the column k, a column β indicates a value $β_K$ of an emission angle corresponding to the column k. Here, the integer k means a surface number from an image surface side, k=0 corresponds to the emission surface 11a corresponding to an image surface of the liquid crystal device (image forming device) 11, and k=1, 2 means a surface of a cover glass of the liquid crystal device 11. k=3, 4 indicates an optical surface of the third lens L3, k=5, 6 indicates an optical surface of the second lens L2, and k=7, 8 indicates an optical surface of the first lens L1. k=9 indicates the light incidence surface IS of the light guide device 20, k=10 indicates the boundary surface IF of the reflection unit 30, and k=11 corresponds to the light emission surface OS.

As is apparent from the above table, an absolute value of the cumulative value (lateral chromatic aberration) $A_K$ of the final index value is 0.075 [deg/μm] and is less than or equal to 0.3 [deg/μm].

Example 2

Hereinafter, optical data in the light path of Example 2 will be described with reference to Table 7. The optical data of Example 2 corresponds to light emitted from one position (x=4.8, y=2.7) of four corners of the liquid crystal device 11, and each light ray and a normal line are not included in the symmetric surface of the optical system. The column α of the table indicates the angle $α_K$ at the time of projecting the incidence side light ray and the normal line of the surface onto the symmetric surface, and the column β indicates the angle $β_K$ at the time of projecting the emission side light ray and the normal line of the surface onto the symmetric surface.

TABLE 7

| k | A | α | β | Glass material | nd | V |
|---|---|---|---|---|---|---|
| 0 | 0 | — | — | Air | 1.0 | 0.0 |
| 1 | −0.020 | −1.08 | −0.74 | SILICA | 1.4585 | −0.0397 |
| 2 | 0.000 | −0.74 | −1.08 | Air | 1.0 | 0.0 |
| 3 | 0.030 | 1.26 | 0.83 | COP | 1.5253 | −0.0552 |
| 4 | −1.574 | 23.88 | 38.12 | Air | 1.0 | 0.0 |
| 5 | 0.604 | 32.42 | 19.76 | PC | 1.5855 | −0.1151 |
| 6 | 2.867 | −14.88 | −24.03 | Air | 1.0 | 0.0 |
| 7 | 1.354 | −19.41 | −12.58 | COP | 1.5253 | −0.0552 |
| 8 | 0.978 | 20.50 | 32.28 | Air | 1.0 | 0.0 |

TABLE 7-continued

| k | A | α | β | Glass material | nd | V |
|---|---|---|---|---|---|---|
| 9 | 1.566 | 43.33 | 26.74 | COP | 1.5253 | −0.0552 |
| 10 | 0.735 | 71.99 | 73.00 | BK7 | 1.5168 | −0.0473 |
| 11 | 0.274 | 17.58 | 27.26 | Air | 1.0 | 0.0 |

As is apparent from the above table, an absolute value of the cumulative value (lateral chromatic aberration) $A_K$ of the final index value is 0.274 [deg/μm].

Example 3

Hereinafter, optical data in a light path of Example 3 will be described with reference to Table 8. The optical data of Example 3 corresponds to light emitted from an opposite position (x=−4.8, y=−2.7) of the four corners of the liquid crystal device 11. In the same manner as in Example 2, the column α of the table indicates the angle $α_K$ at the time of projecting the incidence side light ray and the normal line of the surface onto the symmetric surface, and the column β indicates the angle $β_K$ at the time of projecting the emission side light ray and the normal line of the surface onto the symmetric surface.

TABLE 8

| k | A | α | β | Glass material | nd | V |
|---|---|---|---|---|---|---|
| 0 | 0 | — | — | Air | 1.0 | 0.0 |
| 1 | 0.019 | 1.00 | 0.68 | SILICA | 1.4585 | −0.0397 |
| 2 | 0.000 | 0.69 | 1.00 | Air | 1.0 | 0.0 |
| 3 | −0.041 | −1.75 | −1.15 | COP | 1.5253 | −0.0552 |
| 4 | 1.636 | −24.66 | −39.53 | Air | 1.0 | 0.0 |
| 5 | −0.560 | −32.27 | −19.68 | PC | 1.5855 | −0.1151 |
| 6 | −2.792 | 14.87 | 24.00 | Air | 1.0 | 0.0 |
| 7 | −1.319 | 18.99 | 12.32 | COP | 1.5253 | −0.0552 |
| 8 | −0.941 | −20.12 | −31.65 | Air | 1.0 | 0.0 |
| 9 | −0.020 | 23.68 | 15.27 | COP | 1.5253 | −0.0552 |
| 10 | −0.465 | 56.87 | 57.37 | BK7 | 1.5168 | −0.0473 |
| 11 | −0.784 | 1.65 | 2.50 | Air | 1.0 | 0.0 |

As is apparent from the above table, an absolute value of the cumulative value (lateral chromatic aberration) $A_K$ of the final index value is 0.784 [deg/μm].

1D. Summarization of First Embodiment

According to the virtual image display apparatus 100 of the first embodiment described above, the cumulative value $A_K$ of an index regarding color dispersion for a lateral direction which is a predetermined direction is 0.5 or 0.2 [deg/μm] or less which is a predetermined reference value, and thus, even in a case where a refractive surface inclined with respect to the optical axis AX in the lateral direction is provided at a plurality of places, it is possible to reliably reduce color dispersion as a whole image forming system by collectively handling color separation or lateral chromatic aberration while securing optical performance.

Figure 7:
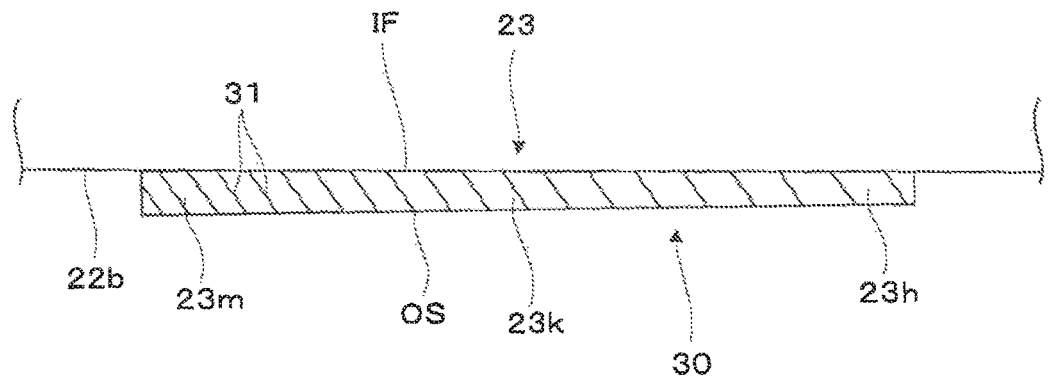
FIG. 7 is a sectional view illustrating a modification example on an emission side of the light path of the image light.

FIG. 7 is a view illustrating a modification example relating to a structure and the like of the emission portion 23 of the light guide device 20. In this case, a thickness of the reflection unit 30 is thick on the incidence side near the incidence portion 21 and is thin on a side which is opposite to the incidence side and is far from the incidence portion 21. In the light guide device 20, the elevation angle φ2 of the image light GL2 is small on a side far from the incidence portion 21 and the reflection unit 30 is thinned, and thereby, it is possible to suppress an increase in the number of times of passing through the mirror 31. Here, it is preferable that the light emission surface OS of the reflection unit 30 on the observation side and the flat surface 22a of the parallel light guide body 22 on the outside are parallel to each other. That is, a portion of the parallel light guide body 22 adjacent to the reflection unit 30 will have a slight wedge angle in principle. Also in this case, the final color dispersion index can be evaluated by using the relational expression (2-2) or (2-4) for the light incidence surface IS (not illustrated), the illustrated boundary surface IF, the light emission surface OS, and the like, and thus, a high-performance virtual image display apparatus 100 in which occurrence of lateral chromatic aberration is suppressed can be obtained.

Figure 8:
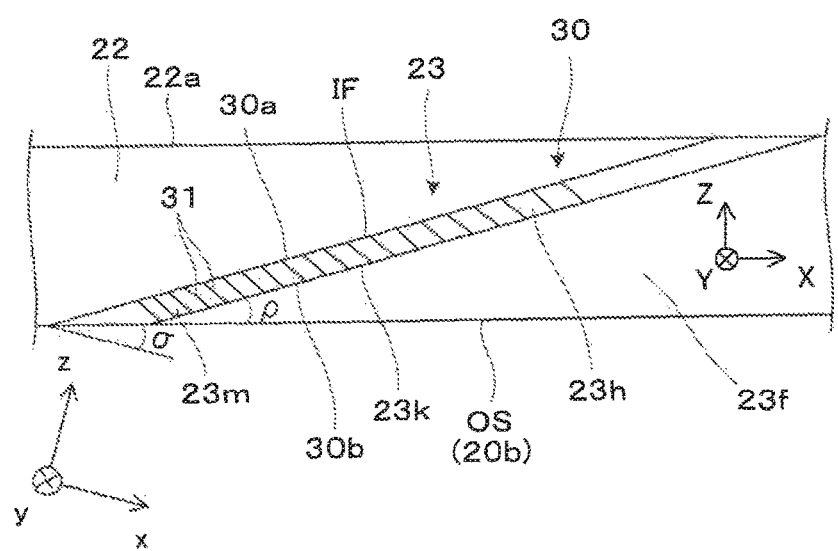
FIG. 8 is a sectional view illustrating another modification example on the emission side of the light path of the image light.

FIG. 8 is a view illustrating another modification example regarding a structure and the like of the emission portion 23 of the light guide device 20. In this case, the reflection unit 30 provided in the emission portion 23 is incorporated in an inclined state. Specifically, the reflection unit 30 is inclined such that the portion 23h on the back side far from the incidence portion 21 is closer to the outside than the portion 23m on the front side close to the incidence portion 21. That is, the incidence surface 30a and the emission surface 30b of the reflection unit 30 are inclined at an appropriate angle ρ less than 90° counterclockwise with respect to the flat surfaces 22a and 22b of the parallel light guide body 22. Here, the emission portion 23 has a prism member 23f of a cross section wedge shape bonded to the emission surface 30b of the reflection unit 30, on the opposite side of the parallel light guide body 22 having the reflection unit 30 therebetween. Thereby, the flat surface 22a of the parallel light guide body 22 on the outside and the light emission surface OS or the flat surface 22b facing the flat surface 22a are parallel, and natural observation of the external light OL can be made. Even if the reflection unit 30 is disposed in an inclined state, if an angle condition is the same as in the example illustrated in FIGS. 2 and 4 and the like, the image light GL reflected by the flat surface 22a of the parallel light guide body 22 on the outside can be reflected by the plurality of mirrors 31 to pass through the light emission surface OS on an observation side, and a virtual image can be formed as in the case of FIG. 2 and the like. In this case, the final color dispersion index can be evaluated by using the relational expression (2-2) or (2-4) for the light incidence surface IS (not illustrated), the surfaces 30a and 30b corresponding to the illustrated boundary surface IF, the light emission surface OS, and the like, and thus, a high-performance virtual image display apparatus 100 in which occurrence of lateral chromatic aberration is suppressed can be obtained.

Second Embodiment

Hereinafter, a virtual image display apparatus in which a light guide device according to a second embodiment of the invention is incorporated will be described. The light guide device according to the second embodiment is configured by partially modifying the light guide device according to the first embodiment, and description on common parts thereof will be omitted.

Figure 9:
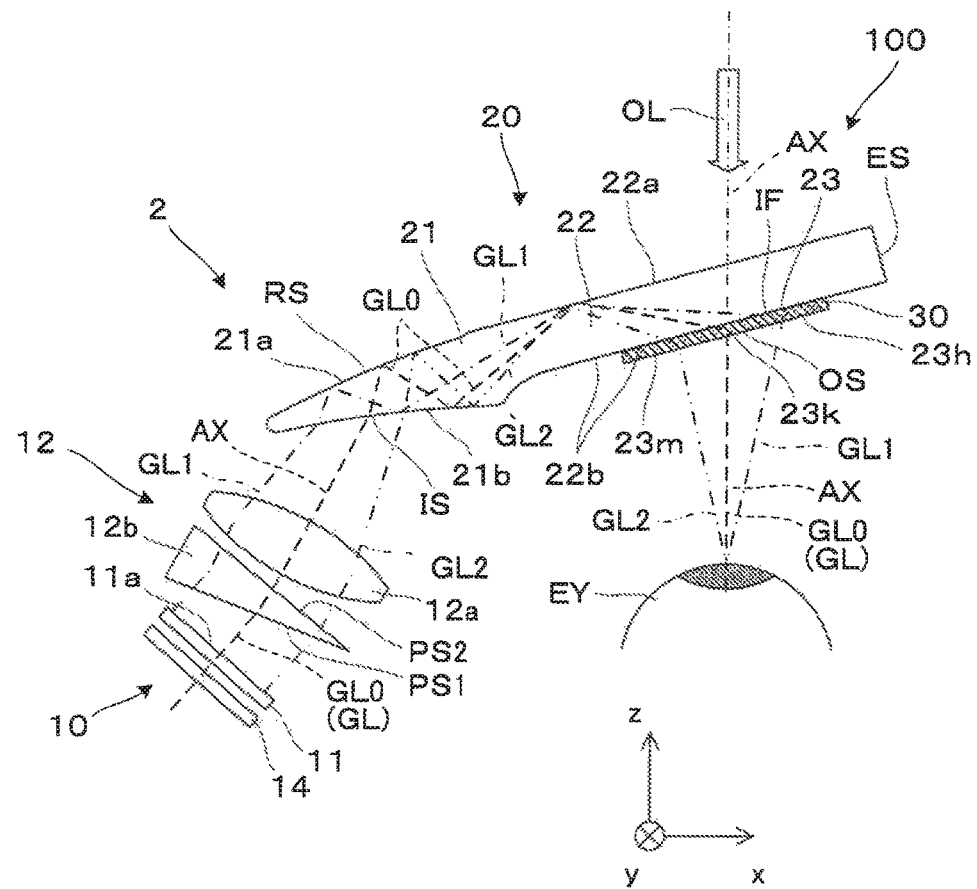
FIG. 9 is a sectional view illustrating a virtual image display apparatus according to a second embodiment.

As illustrated in FIG. 9, in a case of the virtual image display apparatus 100 according to the present embodiment, a projection optical system 12 of the display optical system 2 includes a prism 12b for bending a light path in addition to a collimating lens 12a. The prism 12b for bending a light path has a pair of refractive surfaces PS1 and PS 2, and a light path of the typical image light GL0 on the optical axis AX is bent by the refractive surfaces PS1 and PS2. In this case, the final color dispersion index can be evaluated by using the relational expression (2-2) or (2-4) for the refractive surfaces PS1 and PS2, the light incidence surface IS, the boundary surface IF, the light emission surface OS, and the like, and thus, a high-performance virtual image display apparatus 100 in which occurrence of lateral chromatic aberration is suppressed can be obtained.

The collimating lens 12a and the prism 12b are not required to be separated from each other, and the optical components 12a and 12b can be integrated as one piece.

Third Embodiment

Hereinafter, a virtual image display apparatus in which a light guide device according to a third embodiment of the invention is incorporated will be described. The light guide device according to the third embodiment is configured by partially modifying the light guide device according to the first or second embodiment, and description on common parts thereof will be omitted.

Figure 10:
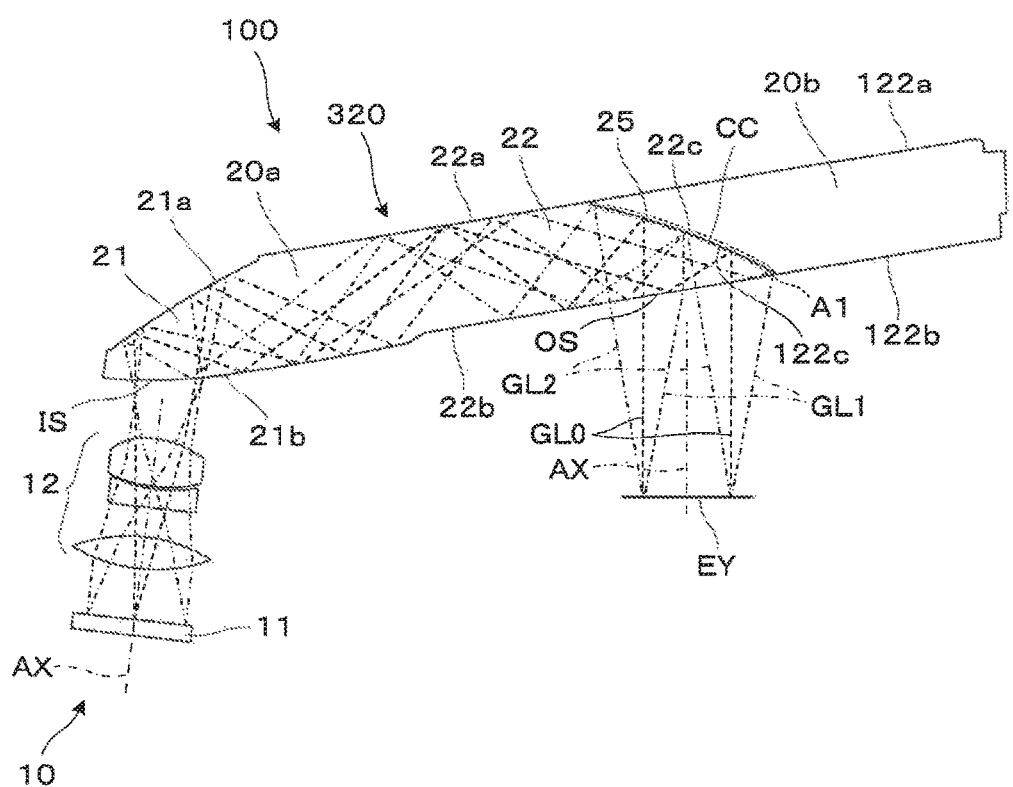
FIG. 10 is a sectional view illustrating a virtual image display apparatus according to a third embodiment.

As illustrated in FIG. 10, the virtual image display apparatus 100 according to the present embodiment includes a light guide member 20a for light guide and perspective, and a light-transmitting member 20b for perspective, as a light guide device 320. Among the members, the light guide member 20a includes the incidence portion 21 and the parallel light guide body 22, and the light-transmitting member 20b is fixed to the parallel light guide body 22.

The parallel light guide body 22 of the light guide member 20a has a curved optical surface 22c on an emission side. A half mirror layer 25 is concomitantly provided on a front surface of the optical surface 22c. The half mirror layer 25 is a reflective film having light transmittance, that is, a semi-transmissive reflective film, and is formed by forming a metal reflective film or a dielectric multilayer film, and reflectance for image light is appropriately set.

The light-transmitting member 20b has flat surfaces 122a and 122b on which a pair of the flat surfaces 22a and 22b provided in the light guide member 20a is disposed on an extended part, and has an optical surface 122c between the flat surfaces 122a and 122b. The optical surface 122c is a curved surface that is bonded to the optical surface 22c of the light guide member 20a and is integrated with the optical surface 22c.

In the light guide device 320, the light guide member 20a is bonded to the light-transmitting member 20b through an adhesive layer CC, and the adhesive layer CC exists on the light-transmitting member 20b side rather than the half mirror layer 25, in an image pickup area A1 where the half mirror layer 25 is provided. The image pickup area A1 is an area where image light is emitted to the eyes of a user.

In this case, by evaluating the final color dispersion index for the light incidence surface IS, the light emission surface OS, and the like, using the relational expression (2-2) or (2-4), a high-performance virtual image display apparatus 100 in which occurrence of lateral chromatic aberration is suppressed can be obtained. The projection optical system 12 may include a prism for bending a light path. In this case, the cumulative value (lateral chromatic aberration) $A_K$ of the index is evaluated by including a refractive surface of the prism for bending the light path.

Fourth Embodiment

Hereinafter, a virtual image display apparatus in which a light guide device according to a fourth embodiment of the invention is incorporated will be described. The light guide device according to the fourth embodiment is configured by partially modifying the light guide device according to the first embodiment, and description on common part thereof will be omitted.

Figure 11:
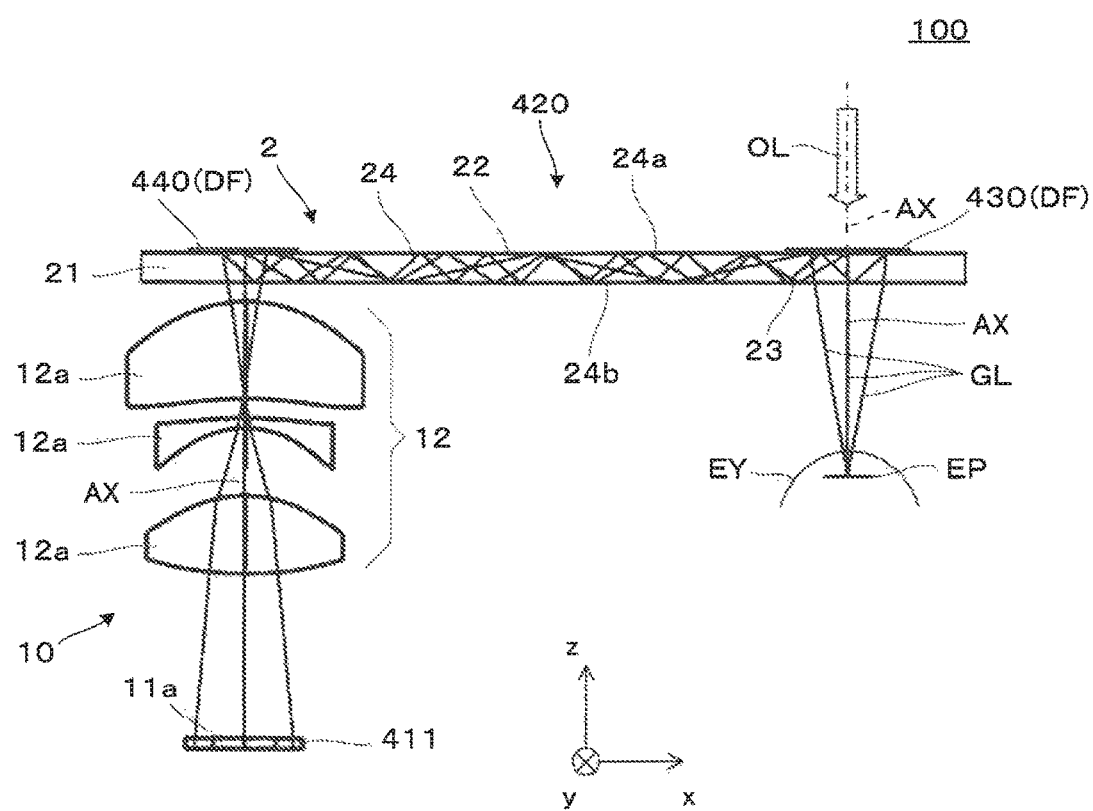
FIG. 11 is a sectional view illustrating a virtual image display apparatus according to a fourth embodiment.

As illustrated in FIG. 11, a virtual image display apparatus 100 according to the present embodiment includes the image projection apparatus 10 and a light guide device 420 as a set. The image projection apparatus 10 includes an image forming device 411 and the projection optical system 12. The image forming device 411 includes a liquid crystal device or other light modulation type display elements, an LED that generates three color lights of RGB, and an LD or other light sources. The projection optical system 12 includes a plurality of lenses 12a which are symmetric to the periphery of the optical axis AX.

The light guide device 420 which configures the display optical system 2 together with the projection optical system 12 includes the incidence portion 21 for taking in image light, the parallel light guide body 22 for guiding light, and the emission portion 23 for picking up the image light. The incidence portion 21 includes a portion of a light guide plate 24 which is a parallel flat plate, on one end side (the left side in the figure), and an incidence side diffraction element 440 of a sheet shape fixed so as to adhere to the flat surface 24a on the outside, on one end side of the light guide plate 24. The parallel light guide body 22 is a portion where both ends of the light guide plate 24 are excluded. The emission portion 23 includes a portion of the light guide plate 24 on the other end side (the right side of the figure), and an emission side diffraction element 430 of a sheet shape that is fixed so as to adhere to the flat surface 24a on the outside, on the other end side of the light guide plate 24.

The light guide plate 24 is formed of a light-transmitting material such as glass or a resin material and has a flat surface 24a which is a total reflection surface on the outside and a flat surface 24b which is a total reflection surface on the back side, as a main surface or a front surface. Both the flat surfaces 24a and 24b are processed into optical surfaces, are light guide surfaces parallel to each other, and have a function of maintaining a propagation angle or a reflection angle of the image light GL propagating the inside of the light guide plate 24.

The incidence side diffraction element 440 couples the image light GL collimated by the projection optical system 12 and incident on the light guide plate 24 through the flat surface 24b with the inside of the light guide plate 24 to propagate through the light guide plate 24, diffracts the image light GL, and converts the incidence angle into a desired diffraction angle. The incidence side diffraction element 440 equivalently functions as an inclined mirror.

The incidence side diffraction element 440 is a reflection type diffraction element and is any one of a hologram and a surface relief diffraction grating. In a case where the incidence side diffraction element 440 is the hologram, the entire incidence side diffraction element 440 functions as a diffractive surface DF. It is preferable that the incidence side diffraction element 440 is a volume hologram, and particularly is a volume phase type hologram from the viewpoint of reducing color separation. In a case where the incidence side diffraction element 440 is the surface relief diffraction grating, a fine diffraction structure formed in the incidence side diffraction element 440 functions as the diffractive surface DF. It is preferable to form as a blazed lattice from the viewpoint of light utilization efficiency. Here, the volume hologram is a hologram in which hologram data is recorded in a relatively thick recording medium as a lattice, and particularly, the volume phase type hologram is obtained by recording hologram data as a refractive index lattice to increase transmittance. The surface relief diffraction grating is obtained by forming a fine concave-convex relief corresponding to an interference pattern on a surface of a thin film, and particularly, the blazed lattice is obtained by forming a fine concave-convex relief of a saw-tooth cross section to enhance diffraction efficiency. The incidence side diffraction element 440 may be a diffraction element that collectively performs diffraction of each color alone, but may be an element in which diffraction elements for each color are stacked.

The emission side diffraction element 430 is coupled with the light guide plate 24 by the incidence side diffraction element 440, picks up the image light GL propagated through the light guide plate 24 to the outside of the light guide plate 24, and diffracts the image light GL to convert a propagation angle thereof into a desired diffraction angle. Thereby, the image light GL incident on the emission side diffraction element 430 from within the light guide plate 24 is recovered to an emission angle equal to an incidence angle before being incident on the original incidence side diffraction element 440. The emission side diffraction element 440 equivalently functions as an inclined mirror, causes the image light GL propagated through the light guide plate 24 to be emitted toward the eye EY side via the flat surface 24b, and has a function of reproducing or projecting an enlarged virtual image corresponding to an image formed on the emission surface 11a of the image forming device 411 in front of the eye EY. The emission side diffraction element 430 is also a reflection type diffraction element in the same manner as the incidence side diffraction element 440, and is any one of a hologram and a surface relief diffraction grating. That is, the emission side diffraction element 430 can be configured by, for example, a volume phase type hologram, a blazed lattice, or the like, and has the diffractive surface DF configured by a recording layer or a fine diffraction structure.

In this case, with respect to an image light ray that is emitted from the center of the emission surface 11a corresponding to an image surface of the image forming device 411 and reaches the center of an eye of an observer via the display optical system 2, for the image light GL and the kth optical function surface (an optical surface or a diffractive surface) of the display optical system 2, assuming that an angle formed by a normal line of an optical function surface in a point at which the image light GL and the optical function surface intersect and an incidence light ray is referred to as $\alpha_k$, an angle formed by the normal line of the optical function surface and an emission light ray is referred to as $\beta_k$, a refractive index of a medium on an incidence side is referred to as $n_{k-1}$, a refractive index of a medium on an emission side is referred to as $n_k$, refractive index dispersion of the medium on the incidence side is referred to as $V_{k-1}$, refractive index dispersion of the medium on the emission side is referred to as $V_k$, a color dispersion index on the incidence side is referred to as $A_{k-1}$, a color dispersion index on the emission side is referred to as $A_k$, a target wavelength is referred to as $\lambda$ (μm), a diffraction order is referred to as integer $m_k$, and a pitch of a diffraction grating is referred to as $p_k$, when values of the color dispersion index $A_k$ (deg/μm) are sequentially calculated by starting from $A_0=0$ (deg/μm), based on following Expression (3-1).

$$A_k = \frac{1}{n_k \cos\beta_k}(V_{k-1}\sin\alpha_k - V_k\sin\alpha_k + n_{k-1}A_{k-1}\cos\alpha_k - m_k/p_k) \quad (3\text{-}1)$$

, it is preferable that the color dispersion index $A_K$ of a final surface obtained by projection onto a symmetric surface is smaller than or equal to a predetermined reference value, assuming that a number of the final surface is referred to as K. Specifically, it is preferable that an absolute value of the color dispersion index $A_K$ obtained by projection onto the symmetric surface is set to be smaller than 0.3. In the description regarding Expression (3-1) described above, it is assumed that not only a refractive surface but also a diffractive surface or a diffraction layer are included in the optical function surface.

Expression (3-1) described above is obtained by replacing Expression (2-1):

$$n_{k-1} \times \sin \alpha_k = n_k \times \sin \beta_k \quad (2\text{-}1),$$

which is described in a case of not including a diffractive surface, with Expression (2-1)':

$$n_{k-1} \times \sin \alpha_k = n_k \times \sin \beta_k + m_k(\lambda/p_k) \quad (2\text{-}1)'$$

and performing conversion processing such as differentiation in the same manner. The diffraction order $m_k$ becomes zero on a normal refractive surface and becomes an integer other than zero on the diffractive surface. In a case where the diffraction order $m_k$=0, Expression (3-1) described above coincides with Expression (2-1) described above in a case of not including the diffractive surface. In a case of a diffraction grating, the pitch $p_k$ between the diffraction gratings means a repetitive interval in a diffraction direction of a repetitive pattern formed in a direction along the optical function surface.

Expression (3-1) described above is a generalized form of the relational expression (2-2), and is a form in which a case where not only a refractive surface but also a diffractive surface exist on a light path is considered. In a case of the display optical system 2 illustrated in FIG. 11, by evaluating the cumulative value $A_K$ of an index using the relational expression (3-1) for the incidence side diffraction element 440 and the emission side diffraction element 430, it is possible to obtain a high-performance virtual image display apparatus 100 in which occurrence of color dispersion is suppressed. For example, the diffraction elements 440 and 430 act on the color dispersion index $A_K$ as the diffractive surface DF as a term m/p in Expression (3-1), and the light incidence surface IS and the boundary surface IF act on the color dispersion index $A_K$ as the refractive surface, as a term $V_{k-1} \sin \alpha_k - V_k \sin \beta_k$ in Expression (3-1). As a result, if a pitch of the incidence side diffraction element 440 and a pitch of the emission side diffraction element 430 coincide with each other, color dispersions generated by both diffraction elements 440 and 430 are cancelled out.

As another viewpoint, in a case where it is considered that a light path is projected onto a symmetric surface (specifically, a lateral cross section (XZ cross section) including the optical axis AX) of the display optical system 2, with respect to an image light ray that is emitted from a certain point of the liquid crystal device (image forming device) 11 and reaches the center of an eye of an observer via the display optical system 2, for the image light GL and the kth optical function surface of the display optical system 2, assuming that an angle formed by a line obtained by projecting a normal line of an optical function surface in a point at which the image light GL intersects the optical function surface onto a symmetric surface of the display optical system 2 and a line obtained by projecting an incidence light ray onto the symmetric surface is referred to as $\alpha_k$, an angle formed by a line obtained by projecting the normal line of the optical function surface onto the symmetric surface and a line obtained by projecting an emission light ray onto the symmetric surface is referred to as $\beta_k$, a refractive index of a medium on an incidence side is referred to as $n_{k-1}$, a refractive index of a medium on an emission side is referred to as $n_k$, refractive index dispersion of the medium on the incidence side is referred to as $V_{k-1}$, refractive index dispersion of the medium on the emission side is referred to as $V_k$, a color dispersion index on the incidence side is referred to as $A_{k-1}$, a color dispersion index on the emission side obtained by projection onto the symmetric surface is referred to as $A_k$, a target wavelength is referred to as $\lambda$ (μm), a diffraction order is referred to as integer $m_k$, and a pitch of a diffraction grating is referred to as $p_k$, when values of the color dispersion index $A_k$ (deg/μm) are sequentially calculated by starting from $A_0$=0 (deg/μm), based on following Expression (3-2), it is preferable that the color dispersion index $A_K$ of a final surface obtained by projection onto the symmetric surface is smaller than or equal to a predetermined reference value, assuming that a number of the final surface is referred to as K.

$$A_k = \frac{1}{n_k \cos\beta_k}(V_{k-1}\sin\alpha_k - V_k\sin\alpha_k + n_{k-1}A_{k-1}\cos\alpha_k - m_k/p_k) \quad (3\text{-}2)$$

Specifically, it is preferable that an absolute value of the color dispersion index $A_K$ obtained by projection onto the symmetric surface is set to be smaller than or equal to 1.0. In the description regarding Expression (3-2) described above, it is assumed that not only a refractive surface but also a diffractive surface are included in the optical function surface for the sake of convenience.

Expression (3-2) is a generalized form of the relational expression (2-4) described in a case of not including the diffractive surface, in the same manner as Expression (3-1) described above, and it is assumed that a case where not only the refractive surface but also the diffractive surface exists on the light path is considered.

In a case where, for example, a volume hologram element is used as the diffraction elements 430 and 440, it is necessary that the pitches $p_k$ are different from each other for each place which a light ray passes through.

In the above description, the diffraction elements 430 and 440 are provided on the flat surface 24a on the outside, but the diffraction elements 430 and 440 may be provided on the flat surface 24b on the rear side. In this case, the diffraction elements 430 and 440 are configured by a transmission type.

Figure 12:
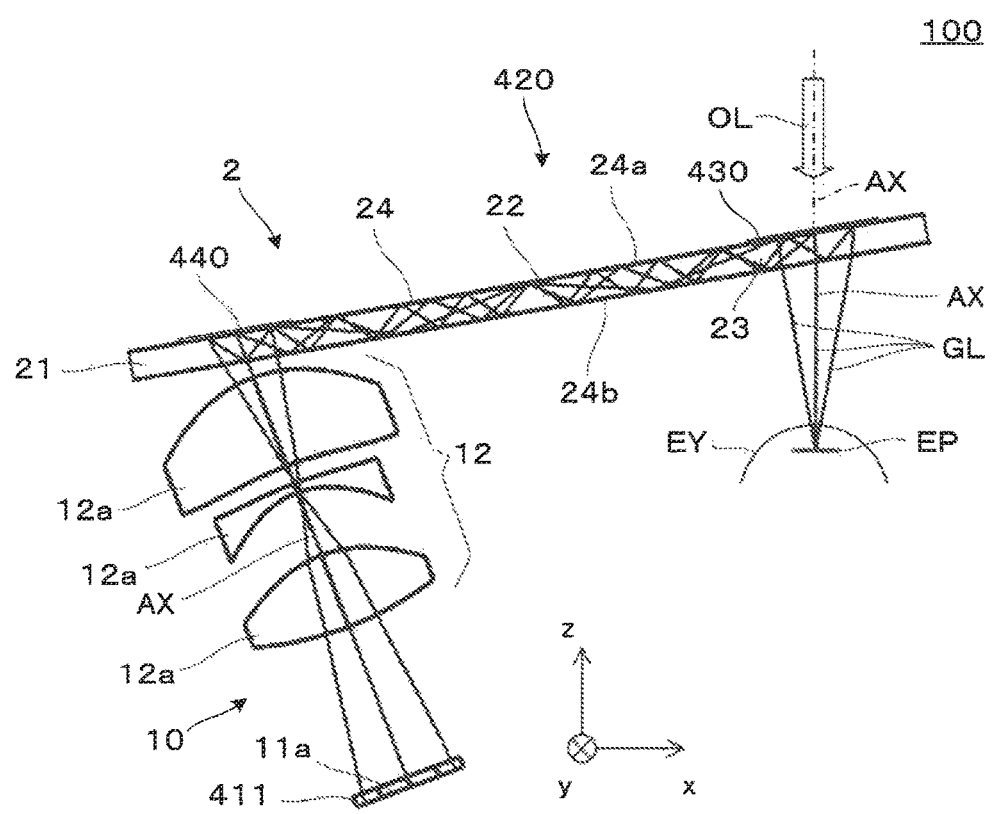
FIG. 12 is a view illustrating a modification example of the virtual image display apparatus illustrated in FIG. 11.

FIG. 12 is a view illustrating a modification example of the virtual image display apparatus 100 illustrated in FIG. 11. In the modification example, the light guide plate 24 is disposed in an inclined manner and follows a shape of a face. Also in this case, it is preferable that the color dispersion index $A_K$ of a final surface is less than or equal to a predetermined reference value, based on Expression (3-1) or Expression (3-2) described above, and specifically, it is preferable that an absolute value of the color dispersion index $A_K$ is smaller than 0.3 or smaller than or equal to 1.0 for each derivation method. As a result, if the pitch of the incidence side diffraction element 440 and the pitch of the emission side diffraction element 430 coincide with each other, color dispersions generated by both diffraction elements 440 and 430 are cancelled out.

Figure 13:
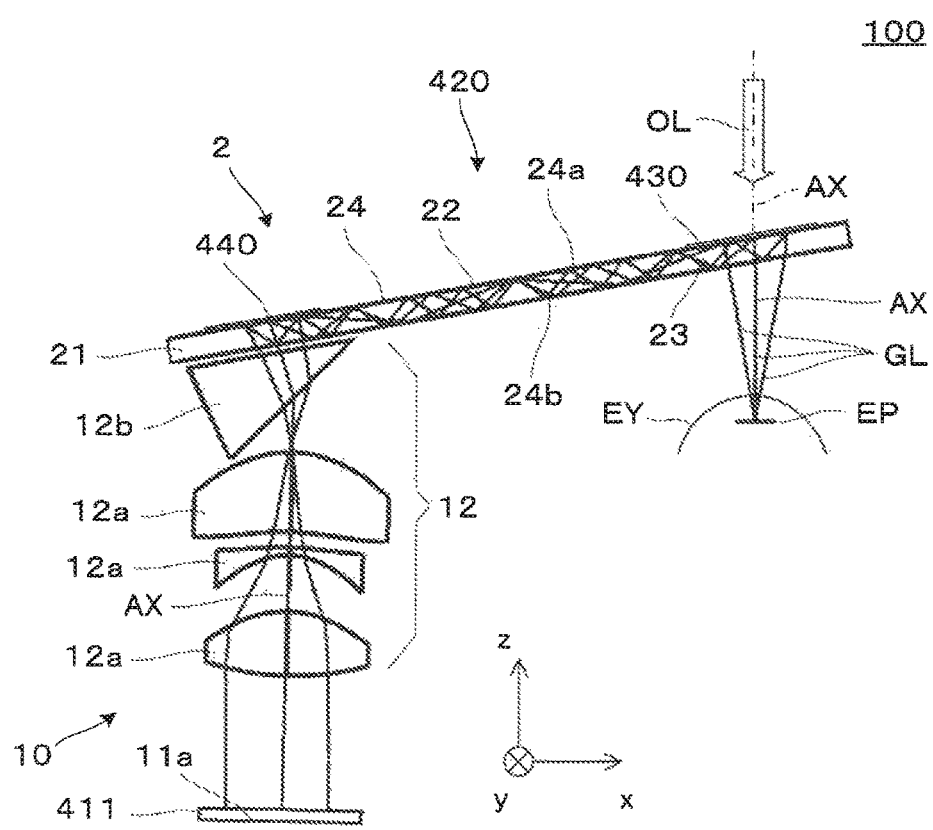
FIG. 13 is a view illustrating another modification example of the virtual image display apparatus illustrated in FIG. 11.

FIG. 13 is a view illustrating another modification example of the virtual image display apparatus 100 illustrated in FIG. 11. Also in this modification example, the light guide plate 24 is inclined and follows a shape of a face, but by inserting the prism 12b into the projection optical system 12 and bending a light path, the projection optical system 12 is prevented from approaching a face side surface. Also in this case, it is preferable that the color dispersion index $A_K$ of the final surface is smaller than or equal to a predetermined reference value, based on Expression (3-1) or Expression (3-2) described above, and specifically, it is preferable that an absolute value of the color dispersion index $A_K$ is smaller than 0.3 or smaller than or equal to 1.0 for each derivation method. As a result, the color dispersion index $A_K$ is evaluated for the prism 12b, the incidence side diffraction element 440, the emission side diffraction element 430, and the like. In this case, since new color dispersion occurs due to addition of the prism 12b, the pitches of the diffraction gratings 430 and 440 are adjusted to compensate for the newly generated color dispersion. At this time, the pitches of the diffraction gratings 430 and 440 may be set to be sufficiently small by tracking and calculating a value of the color dispersion index $A_K$.

Others

Although the invention is described with reference to the above embodiments, the invention is not limited to the above-described embodiments, and can be implemented in various modes without departing from the gist thereof, for example, following modification can also be made.

For example, the light guide device 20 provided in the virtual image display apparatus 100 according to the first embodiment has a configuration in which the image light GL is totally reflected on the flat surface 22a in the parallel light guide body 22 only once and is guided to the reflection unit 30, but can also have a configuration in which the image light GL is totally reflected on the flat surfaces 22a and 22b facing each other multiple times and is guided to the reflection unit 30.

Reflectances of many mirrors 31 provided in the reflection unit 30 coincide with each other in principle, but the reflectances of the mirrors 31 can also be gradually changed from an incidence side close to the incidence portion 21 to a side opposite to the incidence side.

In the above description, the transmissive liquid crystal device 11 is used as an image element and is not limited to the transmissive liquid crystal device, and various image elements can be used. For example, a configuration in which a reflective liquid crystal panel is used can also be provided, and a digital micromirror device or the like can also be used instead of the liquid crystal device 11. In addition, it is also possible to provide a configuration in which a self-light emitting type element represented by an organic EL or the like is used. Furthermore, it is also possible to provide a configuration in which a laser scanner obtained by combining a laser light source, a polygon mirror and another scanner is used.

In the above description, the virtual image display apparatus 100 has a configuration in which the image projection apparatus 10 and the light guide device 20 are provided as a pair corresponding to both the right eye and the left eye, but may have a configuration in which the image projection apparatus 10 and the light guide device 20 are provided only for either the right eye or the left eye such that an image is viewed by one eye.

In the above description, the virtual image display apparatus 100 according to the embodiment is specifically described as a head mounted display, but the virtual image display apparatus 100 according to the embodiment can also be applied to a head-up display, a binocular type hand-held display or the like.

In the above description, the image light is totally reflected and guided by the boundary surface with the air without applying a mirror, a half mirror, or the like on the surface of the flat surfaces 22a and 22b or the curved surface 21b of the parallel light guide body 22 or the like, but the total reflection of the invention also includes reflection achieved by forming a mirror coat or a half mirror film on the whole or a part of the flat surfaces 22a and 22b. The total reflection also includes, for example, a case where an incidence angle of the image light GL satisfies the total reflection condition, the mirror coat or the like is applied to a part of the flat surfaces 22a and 22b, and substantially all the image light is reflected.

It is unnecessary to configure the incidence portion 21 and the parallel light guide body 22 that configures the light guide device 20 as one piece, and the incidence portion 21 and the parallel light guide body 22 are formed as separate members and can also be bonded together using an adhesive.

In the above description, the parallel light guide body 22 is formed horizontally long in the X direction or the x direction, and is formed such that the light incidence surface IS is positioned on the outside of the eye in the horizontal direction, and, if the image light GL can be properly guided to the light guide device 20, a position of the light incidence surface IS is not limited to this and may be provided at, for example, a part or the like of the upper end surface TP and the lower end surface BP on the upper and lower sides of the light guide device 20. In this case, the reflection unit 30 rotates by 90° around the optical axis AX in front of an eye. In this case, instead of the index value of the color dispersion in the lateral direction, the index value or the cumulative value (lateral chromatic aberration) of the color dispersion in the vertical direction is estimated.

In addition, it is also possible to provide a virtual image display apparatus which uses a light conductor optical element or a substrate configured with an array of a partial reflection surface as the light guide device 20 disclosed in JP-A-2010-164988 or JP-A-2013-210633.

Although not described above, the upper end surface TP, the lower end surface BP, and the like of an outer peripheral portion defining an outer shape in the parallel light guide body 22 can be set as a black paint coated surface or a sand blasted surface. Furthermore, black paint coating and sand blasting may be applied to portions other than the upper end surface TP and the lower end surface BP. Black painting or sand blasting may be applied only to a part of the upper end surface TP, the lower end surface BP, and the like.

The entire disclosure of Japanese Patent Application No. 2017-128484, filed Jun. 30, 2017 and 2018-022831, filed Feb. 13, 2018 are expressly incorporated by reference herein.

What is claimed is:

1. A virtual image display apparatus comprising:
   an image forming device that emits image light; and a display optical system that forms a virtual image according to the image light from the image forming device,
   the image light being incident on a position that is assumed to be eyes of an observer,
   wherein the display optical system forms a surface-symmetric shape with respect to a predetermined surface,
   wherein, with respect to an image light ray that is emitted from a certain point of the image forming device and reaches a center of an eye of the observer via the display optical system, for the image light ray and a kth optical function surface of the display optical system, assuming that an angle which is formed by a line which is obtained by projecting a normal line of the optical function surface in a point at which the image light ray intersects the optical function surface onto a symmetric surface of the display optical system and a line which is obtained by projecting an incidence light ray onto the symmetric surface is referred to as $\alpha_k$, an angle which is formed by a line which is obtained by projecting the normal line of the optical function surface onto the symmetric surface and a line which is obtained by projecting an emission light ray onto the symmetric surface is referred to as $\beta_k$, a refractive index of a medium on an incidence side is referred to as $n_{k-1}$, a refractive index of a medium on an emission side is referred to as $n_k$, refractive index dispersion of the medium on the incidence side is referred to as $V_{k-1}$, refractive index dispersion of the medium on the emission side is referred to as $V_k$, a color dispersion index on the incidence side is referred to as $A_{k-1}$, a color dispersion index on the emission side is referred to as $A_k$, a target wavelength is referred to as $\lambda$ in μm unit, a diffraction order is referred to as integer $m_k$, and a pitch of a diffraction grating is referred to as $p_k$, when values of the color dispersion index $A_k$ are sequentially calculated by starting from $A_0=0$, based on following Expression (1), an absolute value of the color dispersion index $A_K$ of a final surface is smaller than 1.0, assuming that a number of the final surface is referred to as K:

$$A_k = \frac{1}{n_k \cos\beta_k}(V_{k-1}\sin\alpha_k - V_k\sin\alpha_k + n_{k-1}A_{k-1}\cos\alpha_k - m_k/p_k) \quad (1)$$

where, $V_k = \frac{dn_k}{d\lambda}$.

2. The virtual image display apparatus according to claim 1,
wherein, assuming that a wavelength of an F line is referred to as $\lambda_F$, a wavelength of a C line is $\lambda_C$, and, in each medium, a refractive index of the F line is referred to as $n_F$ and a refractive index of the C line is referred to as $n_C$, refractive index dispersion $V_K$ is approximately given by $$V_k = \frac{dn_k}{d\lambda} \cong \frac{n_F - n_C}{\lambda_F - \lambda_C}.$$

3. The virtual image display apparatus according to claim 1,
wherein, with respect to the image light ray that is emitted from the center of the image forming device and reaches the center of the eye of an observer via the display optical system, for the image light ray and the kth optical function surface of the display optical system, assuming that an angle which is formed by a normal line of the optical function surface in a point at which the image light ray and the optical function surface intersect and an incidence light ray is referred to as $\alpha_K$, an angle which is formed by the normal line of the optical function surface and an emission light ray is referred to as $\beta_K$, a refractive index of a medium on an incidence side is referred to as $n_{k-1}$, a refractive index of a medium on an emission side is referred to as $n_k$, refractive index dispersion of the medium on the incidence side is referred to as $V_{k-1}$, refractive index dispersion of the medium on the emission side is referred to as $V_k$, a color dispersion index on the incidence side is referred to as $A_{k-1}$, a color dispersion index on the emission side is referred to as $A_k$, a target wavelength is referred to as $\lambda$ in μm unit, a diffraction order is referred to as integer $m_k$, and a pitch of a diffraction grating is referred to as $p_k$, when values of the color dispersion index $A_k$ are sequentially calculated by starting from $A_0=0$, based on following Expression (1), an absolute value of the color dispersion index $A_K$ of a final surface is smaller than 0.3, assuming that a number of the final surface is referred to as K:

$$A_k = \frac{1}{n_k \cos\beta_k}(V_{k-1}\sin\alpha_k - V_k\sin\alpha_k + n_{k-1}A_{k-1}\cos\alpha_k - m_k/p_k). \quad (1)$$

4. The virtual image display apparatus according to claim 3,
wherein the optical function surface of the display optical system has three or more refractive surfaces in which the value $\alpha_k$ is not zero.

5. The virtual image display apparatus according to claim 1,
wherein the optical function surface of the display optical system has at least one non-axis symmetric free curved surface.

6. The virtual image display apparatus according to claim 1,
wherein the optical function surface of the display optical system has a diffractive surface.

* * * * *